US008389081B2

(12) United States Patent
Fujio

(10) Patent No.: US 8,389,081 B2
(45) Date of Patent: Mar. 5, 2013

(54) HEAT-SHRINKABLE CYLINDRICAL LABEL, USE THEREOF, MANUFACTURING METHOD THEREOF, AND CYLINDRICAL MODEL SURFACE HEIGHT MEASUREMENT METHOD

(75) Inventor: Masaaki Fujio, Osaka (JP)

(73) Assignee: Fuji Seal International, Inc., Osaka-shi (JP)

( * ) Notice: Subject to any disclaimer, the term of this patent is extended or adjusted under 35 U.S.C. 154(b) by 935 days.

(21) Appl. No.: 11/814,547

(22) PCT Filed: Jan. 18, 2006

(86) PCT No.: PCT/JP2006/300578
§ 371 (c)(1),
(2), (4) Date: Jul. 23, 2007

(87) PCT Pub. No.: WO2006/077845
PCT Pub. Date: Jul. 27, 2006

(65) Prior Publication Data
US 2009/0202757 A1 Aug. 13, 2009

(30) Foreign Application Priority Data
Jan. 21, 2005 (JP) .................. 2005-013614

(51) Int. Cl.
*F16B 4/00* (2006.01)
*B65B 53/00* (2006.01)
(52) U.S. Cl. ...... 428/34.9; 428/35.7; 428/522; 428/213; 428/910; 428/332; 428/480; 428/318.6; 345/420; 345/426; 345/419; 156/86

(58) Field of Classification Search ................. 428/41.8, 428/34.9, 174, 480, 212, 35.7, 522, 213, 428/910, 318.6, 332; 156/86; 345/420, 426, 345/419
See application file for complete search history.

(56) References Cited

U.S. PATENT DOCUMENTS

| 2001/0043467 A1 * | 11/2001 | Carpenter et al. .............. 362/84 |
| 2003/0107568 A1 | 6/2003 | Urisaka et al. |

FOREIGN PATENT DOCUMENTS

| JP | 61-40200 A | 2/1986 |
| JP | 409330030 | * 12/1997 |
| JP | 2000-211044 A | 8/2000 |
| JP | 2003-168129 A | 6/2003 |

OTHER PUBLICATIONS

Tetsuya Watanabe, "Mapping ni yoru Weathering Koza", Computer Graphics World, May 1, 2001, vol. 4, No. 5, pp. 66 and 67.
International Search Report of PCT/JP2006/300578, date of mailing Apr. 25, 2006.
Japanese Office Action dated Apr. 30, 2010, issued in corresponding Japanese Patent Application No. 2005-013614.

* cited by examiner

*Primary Examiner* — Ellen S Wood
(74) *Attorney, Agent, or Firm* — Westerman, Hattori, Daniels & Adrian LLP

(57) ABSTRACT

A label of the present invention is characterized by a three-dimensional design image printed theron on the basis of two-dimensional image data obtained by three-dimensionally correcting at least one data selected from two dimensional data (X,Y) and color data (R,G,B) to two-dimensionally convert height data (Z) among three-dimensional data (X,Y,Z) and the color data (R,G,B) obtained by actually measuring a surface of a three-dimensional model. Such a label can be provided with printed images giving three-dimensional impressions close to the three-dimensional model (real model).

15 Claims, 16 Drawing Sheets

HEAT-SHRINKABLE CYLINDRICAL LABEL, USE THEREOF, MANUFACTURING METHOD THEREOF, AND CYLINDRICAL MODEL SURFACE HEIGHT MEASUREMENT METHOD

TECHNICAL FIELD

The present invention relates to a label or heat-shrinkable cylindrical label with three-dimensional design images printed thereon, and a labeled-package provided with such a label. The present invention also relates to a method for measuring the profile of a cylindrical model and to a method for making a cylindrical label having a three-dimensional design image printed thereon on the basis of the data obtained by such a measurement method.

BACKGROUND ART

Various types of labels to be fastened or attached to objects such as containers and goods have been used. For example, heat-shrinkable cylindrical labels (also referred to as shrink labels or cylindrical shrink labels) commonly used with cylindrical containers such as beverage containers are labels that are fastened onto the objects by heating at a predetermined temperature. Product names, pictures, company names, instructions, ingredients, and other printed designs are provided to various labels including the heat-shrinkable cylindrical labels.

Such printed designs have decorative and advertising functions and the quality of the printed designs influences the sales of the products. Thus, heat-shrinkable cylindrical labels with fancy printed designs attracting consumers' attentions have been desired.

Thus, an object of the present invention is to provide a label or heat-shrinkable cylindrical label with printed designs of high decorative values and a package provided with such a label. Another object of the present invention is to provide a measurement method suited for actually measuring the profile height on the surface of a cylindrical three-dimensional model and a method for making a cylindrical label using the data obtained by this method.

DISCLOSURE OF INVENTION

To achieve the objects, the present invention provides a label characterized by a three-dimensional design image printed thereon on the basis of two-dimensional image data obtained by three-dimensionally correcting at least one data selected from two dimensional data (X, Y) and color data (R, G, B) to two-dimensionally convert height data (Z) among three-dimensional data (X, Y, Z) and the color data (R, G, B) obtained by actually measuring a surface of a three-dimensional model.

In this label, the three-dimensional design images are printed on the basis of the two-dimensional image data obtained by three-dimensionally correcting at least one data selected from two dimensional data (X, Y) and color data (R, G, B) to two-dimensionally convert height data (Z) among three-dimensional data obtained by actually measuring a surface of a three-dimensional model. Thus, a label with printed designs giving three-dimensional impressions close to that of the three-dimensional model (real model) can be provided.

The present invention also provides a heat-shrinkable cylindrical label that can be fastened to an object such as a container by heat-shrinking, characterized in that three-dimensional design images are printed on a cylindrical label body, in which printing is conducted on the basis of two-dimensional image data, which three-dimensionally expresses a three-dimensional model on a flat surface by three-dimensionally correcting data obtained by actually measuring heights of projecting and recessed parts and colors on a surface of the three-dimensional model, and in which each three-dimensional design image includes a portion which corresponds to the projecting part of the three-dimensional model and which is expressed as bright and a portion which corresponds to the recessed part of the three-dimensional model and which is expressed as dark.

In such a heat-shrinkable cylindrical label, the three-dimensional design images having the portion corresponding to the projecting portion expressed as bright and the portion corresponding to the recessed portion expressed as dark are printed on the cylindrical label body on the basis of the two-dimensional image data that three-dimensionally expresses a three-dimensional model on the flat surface by correcting the data of actually measured profile height and the color on the surface of the three-dimensional model. Thus, a cylindrical label with printed designs giving three-dimensional impressions close to that of the three-dimensional model (real model) can be provided.

The present invention also provides the above-described heat-shrinkable cylindrical label in which when an arbitrary vertical line is assumed to lie in the cylindrical label body, the three-dimensional design image existing in a side region deviating from the vertical line in a circumferential direction of the cylindrical label body has an emphasized three-dimensional presentation compared to the three-dimensional design image existing in a target region including the vertical line.

In general, when a labeled package is produced by fastening a cylindrical label to an object such as a container, the cylindrical label will curve (bend) along the outer surface of the object. When such a curved label is viewed from a particular direction, the three-dimensional design image printed on the label portion directly viewed easily gives three-dimensional impression. In contrast, the three-dimensional design image printed on a label portion deviating (away from) from that portion in the circumferential direction of the cylindrical label body gives weak three-dimensional impressions and tends to be recognized as a printed object printed on a flat surface.

From this standpoint, since the three-dimensional design image in the side region of the heat-shrinkable cylindrical label of the present invention deviating from the vertical line in the circumferential direction of the cylindrical label body has emphasized three-dimensional presentations, when an observer sees the label from the front of the target region including the vertical line, satisfactory three-dimensional impressions can be given to the observer throughout the target region and the side region.

The present invention also provides the heat-shrinkable cylindrical label in which a difference in brightness between the portion corresponding to the projecting part and the portion corresponding to the recessed part is greater in the three-dimensional design image existing in the side region than in the three-dimensional design image existing in the target region.

In such a heat-shrinkable cylindrical label, since the three-dimensional design image in the side region has a brightness difference larger than that in the target region, the three-dimensional presentation of the three-dimensional design image is stronger than that in the target region. Thus, when the cylindrical label is viewed from the front of the target region, satisfactory three-dimensional impressions can be given to the observer throughout the target region and the side region.

The present invention also provides the heat-shrinkable cylindrical label in which the object has a narrow portion with a smaller circumference; and the three-dimensional design image in a portion of the cylindrical label body that comes into contact with the narrow portion of the object upon fastening is printed while being enlarged in the circumferential direction.

According to such a heat-shrinkable cylindrical label, when the label is fastened to the narrow portion, the enlarged three-dimensional design image is contracted in the circumferential direction. Thus, the three-dimensional design image in the portion that in contact with the narrow portion is prevented from being excessively deformed and losing its three-dimensional presentation.

The present invention also provides a method of measuring heights of projecting and recessed parts on a cylindrical model surface, including operating a detector of an analyzer on a surface of a cylindrical three-dimensional model having a reference curved surface on which the projecting and recessed parts are formed, to thereby measure a distance to the cylindrical model surface at each measurement point, in which the detector is operated on a surface of the cylindrical model so as to be substantially orthogonal to a tangent of the reference curved surface at each measurement point, a distance to the cylindrical model surface is measured at each measurement point, and the difference between this measured distance and the distance to the reference curved surface at the corresponding measurement point is calculated to determine the height of the projecting and recessed parts on the cylindrical model surface.

By three-dimensionally correcting the profile height data obtained by actually measuring the cylindrical three-dimensional model by this method, two-dimensional image data that three-dimensionally expresses the model on the flat surface can be obtained. Thus, a cylindrical label with three-dimensional design images printed thereon can be made on the basis of this image data.

A package prepared by fastening the cylindrical label on a cylindrical middle part of the object can give realistic three-dimensional impressions close to that of the three-dimensional model on an observer in all direction around the label.

The present invention also provides a method of measuring heights of projecting and recessed parts on a cylindrical model surface, including operating a detector of an analyzer on a surface of a cylindrical three-dimensional model having a reference curved surface on which the projecting and recessed parts are formed, to thereby measure a distance to the cylindrical model surface at each measurement point, in which a distance to the cylindrical model surface at each measurement point is measured while moving the detector in substantially parallel to a tangent of the reference curved surface at an arbitrary measurement point, and the difference between this distance and the distance to the reference curved surface at the corresponding measurement point is determined to measure the height of the projecting and recessed parts on the cylindrical model surface.

According to this measurement method, the two-dimensional image data can be prepared on the basis of the profile height data obtained by actually measuring the cylindrical three-dimensional model, and a cylindrical label with three-dimensional design image printed thereon can be prepared on the basis of this image data.

A package obtained by fastening the cylindrical label on the middle part of the object can give realistic three-dimensional impressions on the observer directly looking the three-dimensional design images on the label.

The present invention also provides a method for making a cylindrical label, including preparing a printing plate that can express a portion corresponding to a projecting part of a three-dimensional model surface as bright and a portion corresponding to the recessed part of the three-dimensional model surface as dark on the basis of two-dimensional image data obtained by three-dimensional correction to two-dimensionally convert the height data obtained by the measurement method described above.

BEST MODE FOR CARRYING OUT THE INVENTION

The present invention will now be specifically described with reference to the drawings.

First Embodiment

Figure 1A:
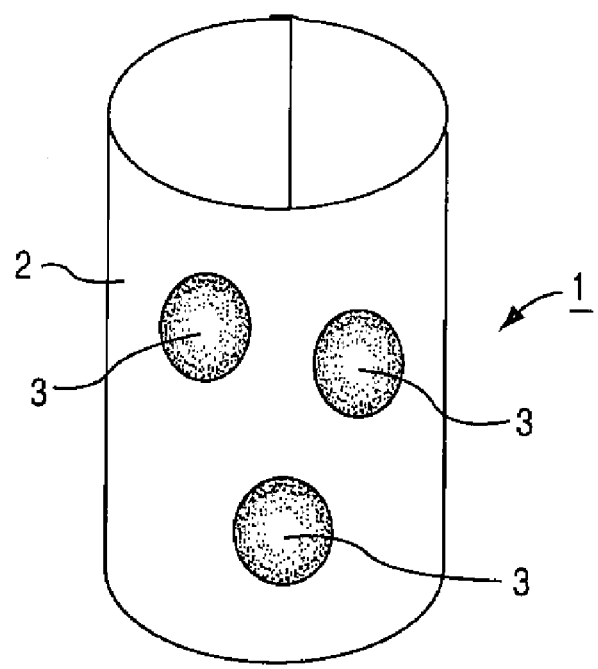
FIG. 1(a) is an oblique view showing a heat-shrinkable cylindrical label of a first embodiment and (b) is a front view of a label base material therefor.
Figure 1B:
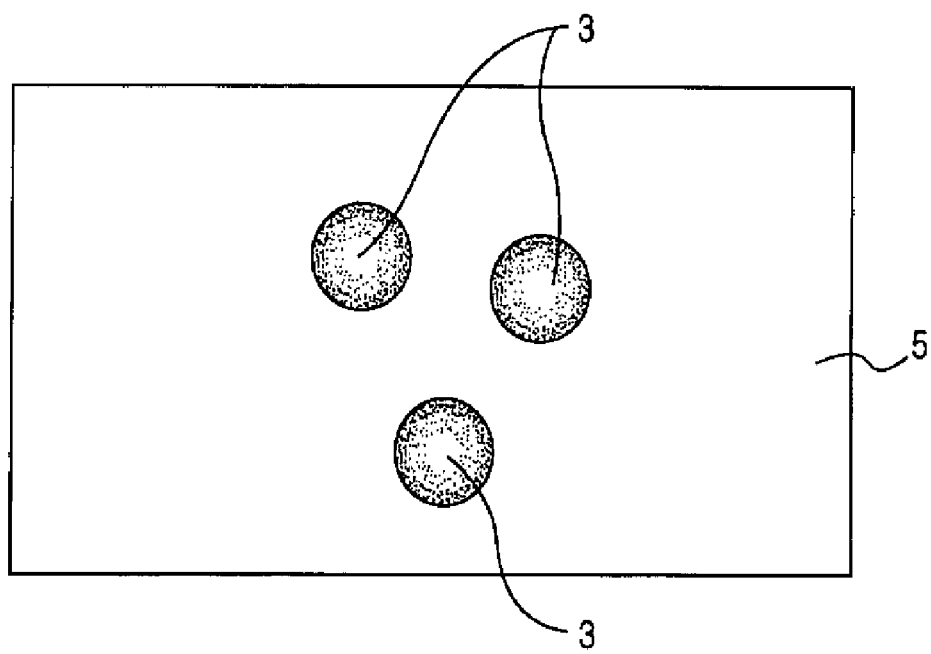

In FIG. 1, reference numeral 1 denotes a heat-shrinkable cylindrical label having a cylindrical label body 2 formed into a cylindrical shape by center-sealing the two ends of a label base material, and a printed design image including a three-dimensional design images 3 printed on the cylindrical label body 2.

A label base material 5 is not particularly limited. Examples thereof include heat-shrinkable resin films, heat-shrinkable foamed resin sheets, and laminated films composed of one material selected from or a mixture of two or more materials selected from polyester resins such as polyethylene terephthalate; olefin resins such as polypropylene; styrenic resins such as polystyrene, styrene-butadiene copolymers; cyclic olefin resins, and thermoplastic resin such as vinyl chloride resins. A heat-shrinkable sheet composed of a laminated film including heat-shrinkable resin films and non-heat-shrinkable sheets such as nonwoven clothes may be used as the heat-shrinkable sheet. For example, when a heat-shrinkable resin film is used as the label base material 5, the film can be obtained by forming a film by a known method such as a T-die method or an inflation method and then stretching the resultant film. The stretching operation is usually conducted at 70° C. to 110° C. by stretching the film approximately 2.0 to 8.0 folds and preferably approximately 3.0 to 7.0 folds in the circumferential direction (the direction of the circumference when the film is formed into a cylindrical label 1). Furthermore, stretching in the longitudinal direction (the direction orthogonal to the circumferential direction) may be conducted at a low ratio of, for example, 1.5 or less. The resultant film is a uniaxial stretched film or a biaxial stretched film moderately stretched in the direction orthogonal to the main stretching direction.

A material that exhibits a heat-shrinking ratio in the circumferential direction of about 30% or more, preferably 40% or more, and most preferably 50% or more when the material is formed into a cylindrical label 1 and immersed in 90° C. hot water for 10 seconds is used as the label base material 5. Note that materials with a heat-shrinking ratio in the longitudinal direction of 0% to 10% and preferably 0% to 6% are given as the examples.

Heat-shrinking ratio is determined by: Heat-shrinking ratio (%)=[{original length in the circumferential direction (or longitudinal direction))−(length in the circumferential direction (or longitudinal direction) after immersion)}/(original length in the circumferential direction (or longitudinal direction))]×100.

As the label base material 5, a transparent colored or colorless sheet through which the printed design image can be seen is used. However, the label base material 5 is not limited to the transparent sheet, and an opaque sheet may be used. In such a case, the printed design image is on the outer surface of the label base material 5.

A printed design including three-dimensional design images 3 and regular design images (the design images not processed to appear three-dimensionally, not shown in the drawings) is printed on an inner surface of the label base material 5 by a known printing method such as multicolor gravure printing so that the images can be seen from the outer-surface-side. Note that the printed design image can be provided on the outer surface of the label base material 5.

The three-dimensional design images 3 are printed images formed by printing on the two-dimensional label base material 5 such that the images appear as if they are in three dimensions. When visual information entering from eyes of an observer is recognized by the cerebrum, the cerebrum corrects the visual information by referring the information with the past memory. The printed image expressed in two dimensions can give three-dimensional impressions on the observer by taking advantages of this mechanism.

According to the present invention, a printing plate is prepared on the basis of two-dimensional image data (X, Y, R, G, B) obtained by conducting three-dimensional correction on at least one data selected from two dimensional data (X, Y) and color data (R, G, B) so that the height data (Z) among the three-dimensional data (X, Y, Z) and color data (R, G, B) on the surface of a three-dimensional model is two-dimensionally converted, and the three-dimensional design images 3 are printed on the label base material 5 using this printing plate. This is because realistic three-dimensional images can be produced thereby.

Here, "X, Y" indicates coordinate data of the three-dimensional model on a two-dimensional plane and Z indicates the height data at the coordinates X, Y. "R, G, B" indicates color data representing three color elements, red, green, and blue.

A three-dimensional model is a model that has an appropriate three-dimensional design that a user wishes to create and is not particularly limited.

Figure 2:
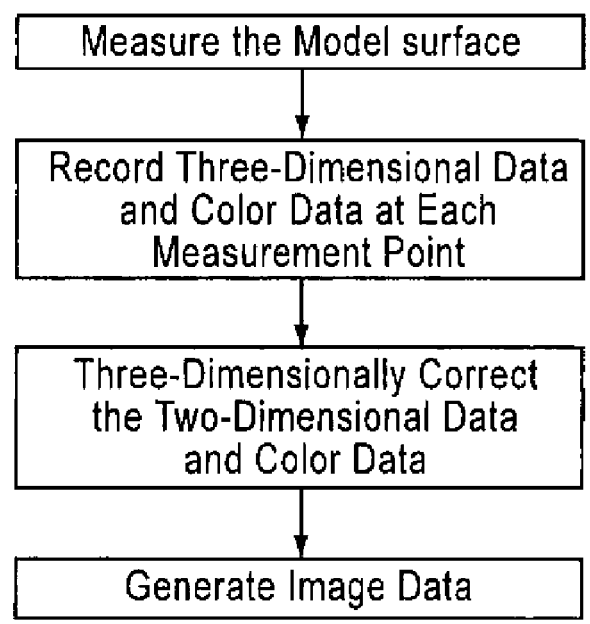
FIG. 2 is a flowchart showing the steps of generating two-dimensional image data.

The two-dimensional image data, which is the basis of the three-dimensional design image 3, can be obtained by a known image processing method. For example, as shown in the flowchart of FIG. 2, the three-dimensional data (X, Y, Z) and the color data (R, G, B) of the three-dimensional model surface are actually measured at each measurement point (the intersection X, Y in the X direction and Y direction that intersect each other in the plane of the object to be measured, the measurement point corresponding to a pixel). Three-dimensional correction of correcting at least one data selected from the two-dimensional data (X, Y) and color data (R, G, B) is conducted according to the height data (Z) obtained by actual measurement at each measurement point (pixel) so as to convert the three-dimensional design acquired from the three-dimensional model into a two-dimensional design (two-dimensional image data).

In the three-dimensional correction, the measured values of the two-dimensional data and the color data are subject to image processing to two-dimensionally convert the height data and to thereby obtain two-dimensional image data. Examples of the three-dimensional correction procedures include: (A) correcting the measured shape (the profile of the design on the model surface expressed as a set of two-dimensional data (X, Y)) so as to change the shape itself; (B) correcting the line of the actually measured shape (profile line) to sharpen or blur the profile line; (C) correcting and changing the color actually measured such that the high part appears brighter and the low part appears darker according to the height data; (D) correcting the colors actually measured to increase the difference in brightness of the colors; (E) correcting the colors actually measured to sharpen or blur the colors; (F) correcting the colors actually measured to change the gradation; (G) correcting the color actually measured to add artificial gloss or reflection of light; (H) correcting the shape and colors actually measured to add shades; and (I)

conducting a complex correction that adequately combines the correcting procedures (A) to (H).

The two-dimensional image data used in the present invention can be obtained by one technique selected from the above-described three-dimensional correcting operations. In particular, the three-dimensional design image 3 preferably contains a part corresponding to the projecting part of the three-dimensional model expressed to be brighter and a part corresponding to the recessed part of the three-dimensional model expressed to be darker since this easily gives an observer three-dimensional impressions.

In the example shown in FIG. 1, three hemispherical projecting designs are used as the three-dimensional model. Each three-dimensional design image 3 formed on the basis of the two-dimensional image data obtained by correcting the data obtained by actually measuring the model is bright at the portion corresponding to the projecting part of the hemisphere of the model (center portion of the circle) and becomes darker in the surrounding portions as the height is decreased.

In the three-dimensional design image 3 of each drawing, the profile (shape) is expressed with solid lines, and the portions of the printed images corresponding to the projecting parts of the three-dimensional model are left blank (unpainted). As a general rule, the density of paint decreases toward the projecting portion of the model and the portion of the printed image corresponding to the recessed part (lower part) is expressed by painting at high density.

In order to produce a more realistic three-dimensional impression by expressing shadows of the projecting and recessed parts of the three-dimensional model irradiated with light, shades may be added to the three-dimensional design images 3.

Figure 3A:
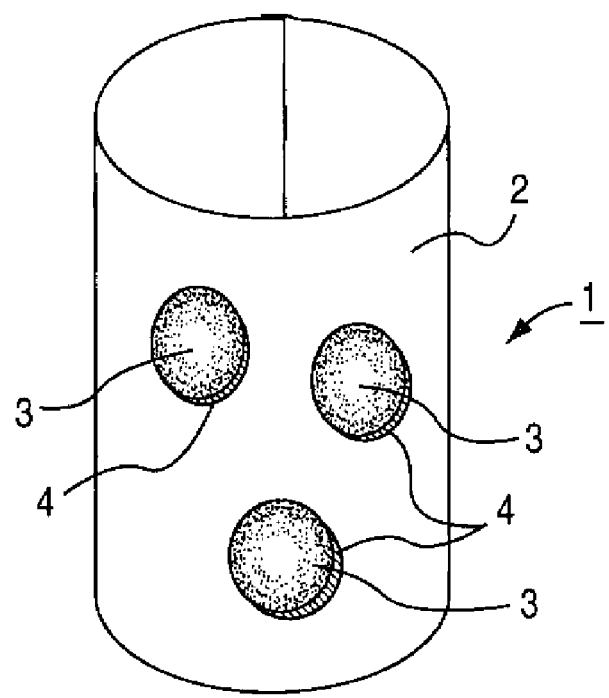
FIG. 3(a) is an oblique view showing a modification of the heat-shrinkable cylindrical label of the first embodiment and (b) is a front view of a label base material therefor.
Figure 3B:
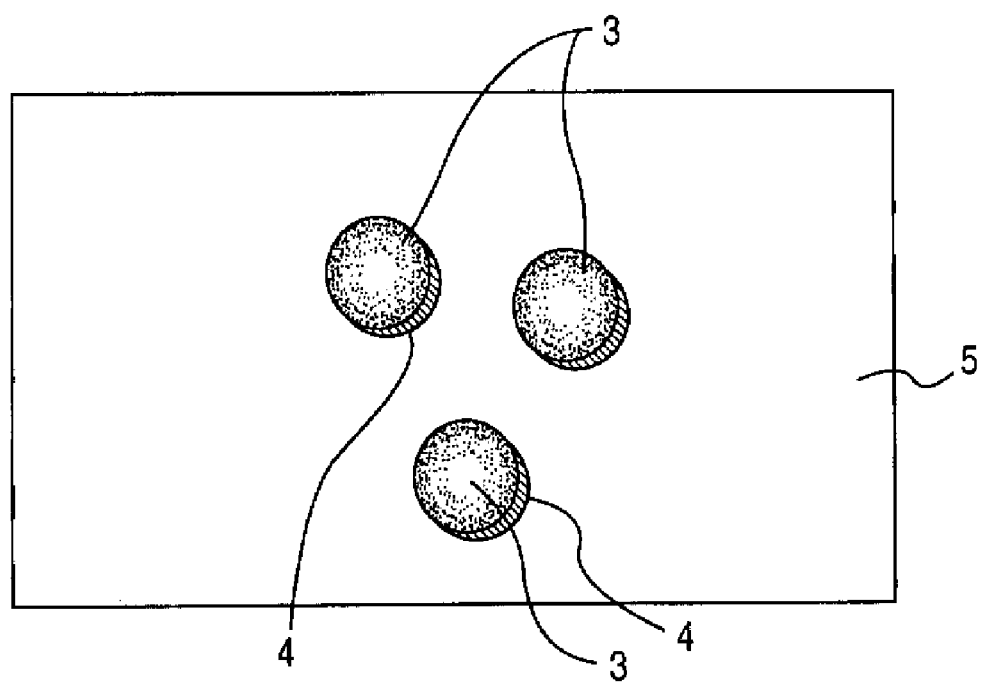

For example, as shown in a modification of FIG. 3, a shade image 4 (expressed by bold diagonal lines for the sake of convenience) may be added to a part around the three-dimensional design image 3. In such a three-dimensional design image 3, the shade image 4 is expressed as a dark colored (including dark gray, dark blue, and the like) portion extending outward from a part of the border of the three-dimensional design image 3.

Note that the example shown in FIG. 3 indicates the state in which hemispherical projecting designs identical to the three-dimensional model on which the three-dimensional design images 3 shown in FIG. 1 are based are irradiated with light from the upper left-hand side. As is evident from the comparison with FIG. 1, FIG. 3 illustrates an example having a shade image 4 outside (lower right-hand side) the outline of the three-dimensional design image 3 identical to that shown in FIG. 1.

It should be noted here that the shade image 4 is not limited to those that show the state in which the model is irradiated with light from the upper left-hand side. For example, the shade image 4 may be added to the three-dimensional design image 3 to show the state in which the model is irradiated with light from the upper right-hand side.

Figure 4A:
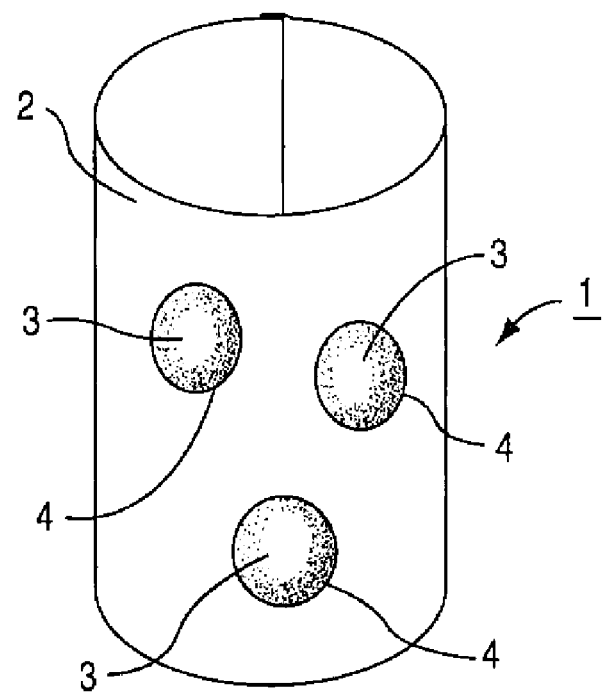
FIG. 4(a) is an oblique view showing another modification of the heat-shrinkable cylindrical label of the first embodiment and (b) is a front view of a label base material therefor.
Figure 4B:
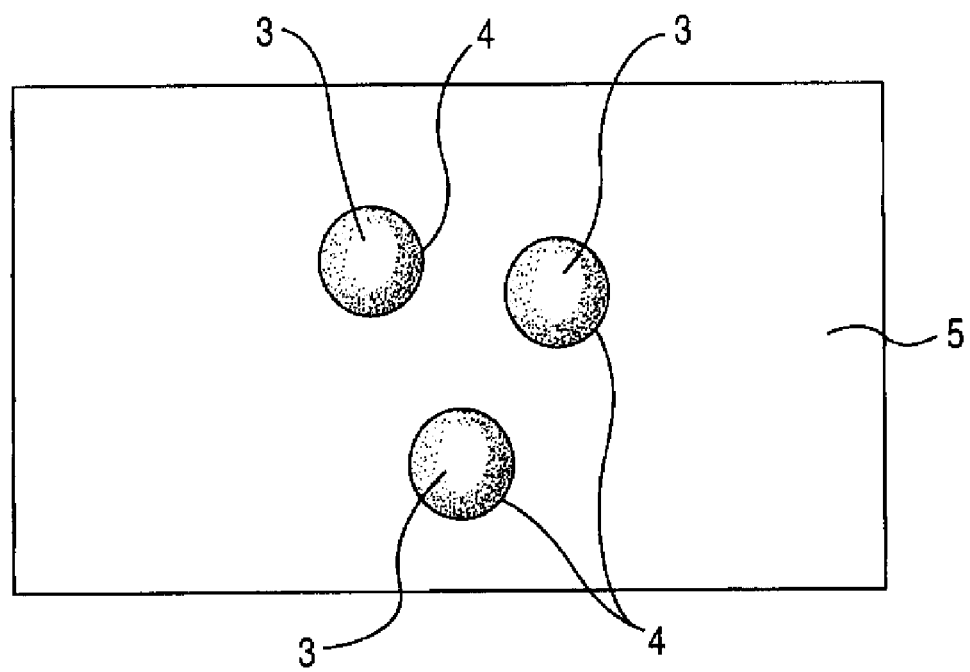

Alternatively, as in a modification shown in FIG. 4, the shade image 4 may be added by shading a part of the three-dimensional design image 3 (e.g., the portion of the printed image corresponding to the recessed part) as described above so that it appears as if there is a shadow.

Note that the example shown in FIG. 4 shows the state in which hemispherical projecting portions identical to the three-dimensional model on which the three-dimensional design image 3 shown in FIG. 1 is based are irradiated with light from the upper left-hand side. As is evident from the comparison with FIG. 1, the three-dimensional design image 3 in FIG. 4 is bright at the upper left-hand side and dark at the lower right-hand side.

Alternatively, part of the three-dimensional design image 3 may be darkened and a dark portion may be added outside the border of the three-dimensional design image 3 to form a three-dimensional design image 3 with a shade image 4, although this is not shown in the drawings.

Figure 5A:
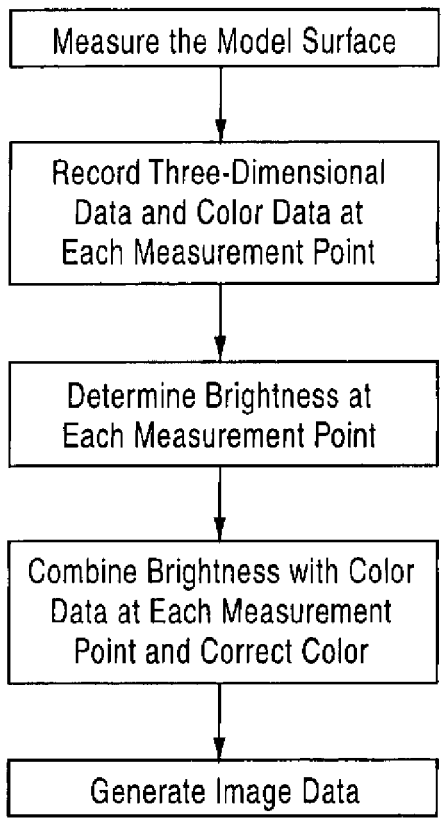
FIGS. 5(a) and (b) are each a flowchart showing the steps of generating two-dimensional image data.
Figure 5B:
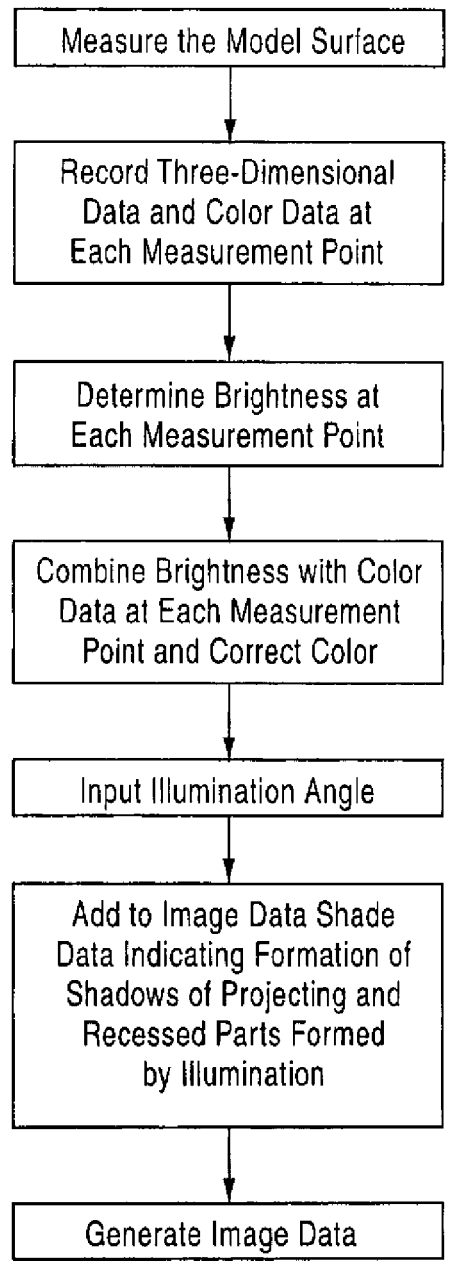

The two-dimensional image data based on which the three-dimensional design image 3 with a bright part corresponding to a projecting part is formed can be prepared by a known image-processing method. For example, as shown in FIG. 5(*a*), the three-dimensional data and the color data at the surface of the three-dimensional model are measured at each measurement point. Then, based on the height data obtained by actual measurement at each measurement point (pixel), the brightness at each measurement point is determined such that the higher portion is brighter and a lower portion is darker according to the height distribution. The color data measured at each measurement point is combined with the brightness determined on the basis of the height data to generate two-dimensional image data. The two-dimensional image data obtained has the profile and colors of the actual designs of the three-dimensional model, and the actual color of the part corresponding to the projecting part of the model is expressed to be bright and the actual color of the part corresponding to the recessed part is expressed to be dark. Moreover, the actual colors of the portions having intermediate heights between the projecting part and the recessed part are rendered intermediate and gradual brightness according to the height.

A printing plate is prepared on the basis of the two-dimensional image data in combination with regular design images (images not subjected to three-dimensional image processing). A cylindrical label 1 with a printed design presentation including three-dimensional design image 3 can be obtained by conducting printing on the label base material 5 using the printing plate.

In order to generate two-dimensional image data including the shade image 4, during generation of two-dimensional image data according to the flowchart of FIG. 5(*a*), the three-dimensional model is irradiated with light in a desired direction to actually form shadows of the projecting portions and the three-dimensional data and the color data on the surface of the three-dimensional model in such a state are actually measured. The color that actually darkened due to the shadow is captured as the color data so that the two-dimensional image data including the shade image 4 can be generated.

It is also possible to generate two-dimensional image data including the shade image 4 by mechanical image processing. For example, as shown in the flowchart in FIG. 5(*b*), after the two-dimensional image data which forms the basis of the three-dimensional design image 3 is produced, the desired illumination angle is designated (e.g., when expression of the state in which the three-dimensional model is irradiated from the left-hand side is desired, the illumination angle is designated as "left"). The shade data that expresses shadows, which are expected to form according to the height data and the designated illumination angle, by using a dark color is computed, and then subjected to image-processing so that the shade data is added to the two-dimensional image data.

Based on the two-dimensional image data including the shade image 4, a printing plate is prepared by adding regular design images if necessary, and printing is conducted on the label base material 5 to obtain a cylindrical label 1 having a printed design image including three-dimensional design images 3 with shade images 4.

The two-dimensional image data described above can be produced by a known image-processing apparatus, e.g., an apparatus disclosed in Japanese Unexamined Patent Application Publication No. 10-27242. The image-processing apparatus described in this publication measures the profile of the surface of the three-dimensional model, calculates the gradient data for a plurality of height data on the basis of the plurality of height data observed, and adjusts the gradient data according to the illumination angle to form two-dimensional image data according to the height data and the adjusted gradient data in a particular direction.

The heat-shrinkable cylindrical label 1 described above is usually available in a roll formed by processing a label base material continuous body consisting of continuously connected label base materials 5 into a cylindrical form to obtain a cylindrical label continuous body consisting of continuously connected cylindrical labels 1 and by flattening the continuous body and winding the flattened continuous body into a roll. In use, the flattened cylindrical label continuous body is withdrawn from the roll of the cylindrical label continuous body, cut to a predetermined length, allow to open into a cylindrical shape, fit to an object such as a beverage container, and then heated to a heat-shrinking temperature to thereby obtain a labeled package.

The labeled package attracts attention of the observer and thus has high decorative value since the three-dimensional design images 3 appear on the outer surface of the cylindrical label 1.

Since the three-dimensional design image 3 is printed on the basis of the two-dimensional image data obtained by two-dimensionally converting the data obtained by actual measurement of the profile of the surface of a three-dimensional model, the observer will have accurate and realistic three-dimensional impressions.

Second Embodiment

A second embodiment relates to a heat-shrinkable cylindrical label in which a three-dimensional design image is printed while being enlarged in the circumferential direction. In the description below, features different from the examples described in the first embodiment are mainly described, and the explanation of the like features is omitted by citing the terms and reference numerals.

Figure 6A:
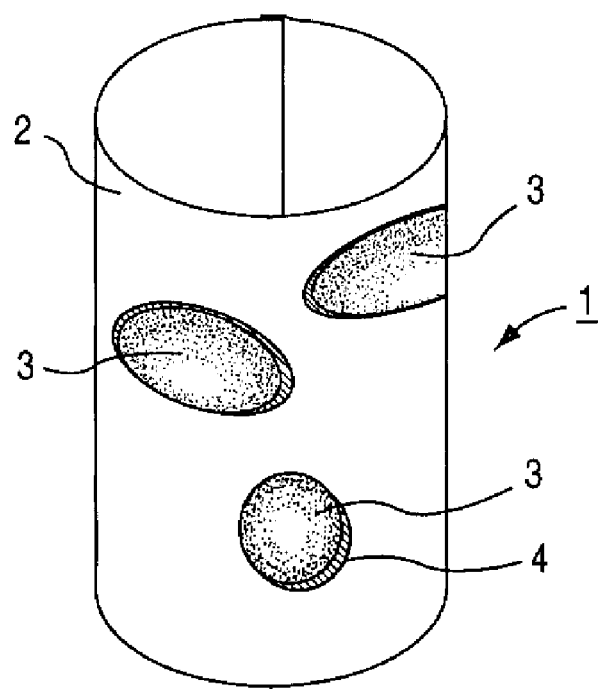
FIG. 6(a) is an oblique view of a heat-shrinkable cylindrical label of a second embodiment and (b) is a front view of a label base material therefor.
Figure 6B:
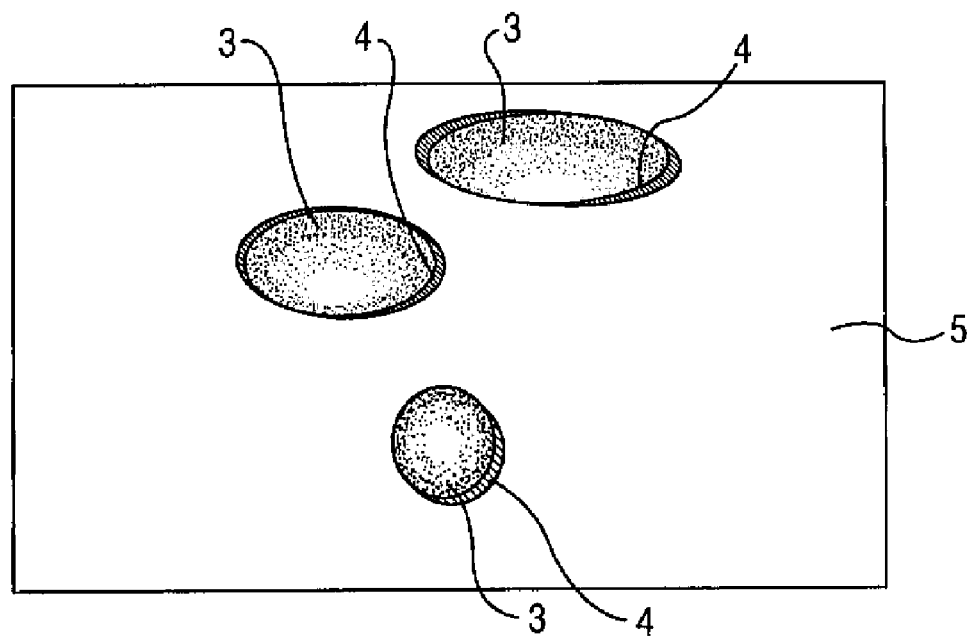

As shown in FIG. 6, some of the three-dimensional design images 3 in the cylindrical label body 2 are printed as they are enlarged in the circumferential direction of the cylindrical label body 2.

The position and the ratio of enlargement of the three-dimensional design images 3 to be enlarged and printed are appropriately planned according to narrow portions of the package on which the cylindrical label 1 is fastened.

Figure 7:
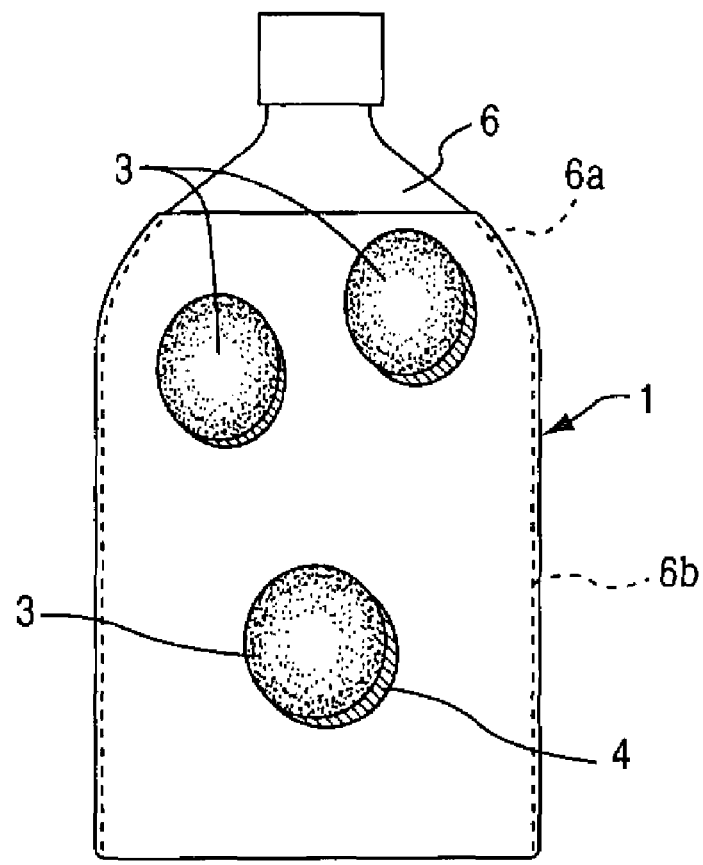
FIG. 7 is a plan view of a labeled package having the heat-shrinkable cylindrical label fastened thereon.

That is, the heat-shrinkable cylindrical label 1 of the second embodiment is suitable to be fastened on an object with a narrow portion having a small circumference (length of the contour in the circumferential direction). Examples of such an object 6 include, for example, a beverage container 6 (bottle-shaped container) having a shoulder 6a (narrow portion 6a) that gradually narrows toward the upper-side and is disposed above a middle part 6b, as shown in FIG. 7. Other examples of the object 6 include a calabash-shaped container 6 having a constricted part and a container 6 having a spherical or elliptical overall shape, although such examples are not shown in the drawings.

The three-dimensional design images 3 in the portion of the cylindrical label 1 that comes into close contact with the narrow portion 6a of the object 6 when the cylindrical label 1 is fastened on the object 6 are printed by enlarging the images in the circumferential direction according to the difference in diameter at the narrow portion 6a. The position and the ratio of enlargement of the three-dimensional design images 3 are adequately set according to the position of the narrow portion 6a of the object 6 or the difference in diameter.

In general, the length of the heat-shrinkable cylindrical label 1 in the circumferential direction is set to approximately 1.02 to 1.15 times the circumference of the middle part 6b (part with the largest circumference) of the object 6. Thus, for example, when the heat-shrinkable cylindrical label 1 having a length 1.1 times the circumference of the middle part is fastened to the object 6 by heat-shrinking, the label portion that comes into close contact with the middle part 6b undergoes a heat-shrinkage of approximately 9% on the basis of the formula: {(original length of label in circumferential direction−length after heat shrinkage)/original length of label in circumferential direction}×100.

However, the label portion in close contact with the narrow portion 6a undergoes a greater degree of heat shrinkage. Thus, the three-dimensional design images 3 located in that portion deform as they are compressed in the circumferential direction. In particular, for example, when a heat-shrinkable cylindrical label 1 having a dimension 1.1 times the middle part circumference is fastened to the narrow portion 6a having a length 0.7 times the middle part circumference, the label portion in close contact with the narrow portion 6a undergoes heat-shrinkage of approximately 36% according to the formula described above. Similarly, when the label is fastened to a narrow portion with a length 0.8 times the middle part circumference, the label portion in close contact with the narrow portion 6a undergoes heat-shrinkage of about 27% according to the formula described above.

Thus, in this example, the label portion in close contact with the narrow portion 6a having a length 0.7 times the middle part circumference undergoes heat shrinkage approximately 27% greater than that of the label portion in close contact with the middle part 6b. The label portion in close contact with the narrow portion 6a having a diameter 0.8 times the middle part circumference undergoes heat shrinkage approximately 18% greater than that of the label portion in close contact with the middle part 6b. Thus, the three-dimensional design images 3 located in the label portion in close contact with the narrow portion 6a with a length 0.7 times that the middle part circumference are enlarged by a ratio of 1/0.73 in the circumferential direction and printed. The three-dimensional design images 3 located in the label portion in close contact with the narrow portion 6a with a length 0.8 times that the middle part circumference are enlarged by a ratio of 1/0.82 in the circumferential direction and printed.

Note that the heat-shrinkable cylindrical label 1 shown in FIG. 6 is an example of a cylindrical label fastened up to the neck 6a of the bottle-shaped container 6 constituted from the cylindrical middle part 6b and the neck 6a that gradually narrows toward the upper side as shown in FIG. 7. Thus, the ratio of enlarging the three-dimensional design images 3 increases toward the upper side in accordance with the difference in diameter of the neck 6a.

In this embodiment, since the three-dimensional design images 3 in the label portion in close contact with the narrow portion 6a are printed as they are enlarged in the circumferential direction, the three-dimensional design images 3 in the portion in close contact with the narrow portion 6a will shrink in the circumferential direction when the cylindrical label 1 is fastened on the object 6 by heat-shrinking.

Thus, as shown in FIG. 7, the three-dimensional design images 3 of the cylindrical label 1 in the middle part 6b and the neck 6a of the resulting labeled package will be reproduced in a manner substantially identical to the original two-dimensional image data.

The heat-shrinkable cylindrical label 1 of this embodiment can be produced by the following procedure, for example.

First, two-dimensional image data is prepared by the method shown in the first embodiment. Note that the two-dimensional image data may contain shading data representing the shade images 4.

Next, of the two-dimensional image data, the three-dimensional design images 3 to be printed on the label portion that contacts with the narrow portion 6a are corrected by enlarging the three-dimensional design images 3 in the circumferential direction according to the difference in diameter of the narrow portion 6a (blow-up operation). The correction may be conducted using a computer or the like. On the basis of the corrected and enlarged two-dimensional image data, a printing plate is prepared in the same manner as in the first embodiment, and the three-dimensional design images 3 are printed on the label base material 5 using the printing plate. Subsequently, the label base material 5 is formed into a cylinder to thereby obtain a heat-shrinkable cylindrical label 1 of the second embodiment.

Note that in this embodiment, when regular design images as well as the three-dimensional design images 3 are to be printed on the label portion that contacts the narrow portion 6a, it is preferable to also enlarge the regular design images in the circumferential direction.

Moreover, when the cylindrical label 1 is heat-shrunk, the printed image in the label portion in close contact with the narrow portion 6b undergoes change in color density. In other words, since the density of the color of the printed image will increase with shrinking, the three-dimensional design images 3 (including normal design images where necessary) to be enlarged and printed are preferably corrected such that the printing density is lower in accordance with the ratio of enlargement.

Third Embodiment

A third embodiment relates to a heat-shrinkable cylindrical label in which the three-dimensional presentation of the three-dimensional design images in the side regions is emphasized. In the description below, features different from the examples described in the previous embodiments are mainly described, and the explanation of the like features is omitted by citing the terms and reference numerals.

In the heat-shrinkable cylindrical label 1 of this embodiment, the two-dimensional image data is corrected such that the three-dimensional design images 3 existing in the regions that deviate from an arbitrary imaginary vertical line in the circumferential direction of the cylindrical label body 2 (also referred to as "side regions" hereinafter) have more emphasized three-dimensional presentation than the three-dimensional design images 3 in the region containing the imaginary vertical line (also referred to as "target region" hereinafter); and the designs are printed on the label base material 5 based on the emphasized two-dimensional image data and the label base material 5 is formed into a cylindrical shape.

When the three-dimensional presentation of the three-dimensional design images 3 existing in the side regions is emphasized and an observer sees the label from the directly front of the target region, not only the three-dimensional design images 3 in the target region but also the three-dimensional design images 3 in the side regions will give satisfactory three-dimensional impressions on the observer.

In other words, in general, a cylindrical label once fastened to an object such as a container will be curved (including bent) along the outer surface of the object. When the curved label is observed in a particular direction, the three-dimensional design images printed on the label portion directly observed easily appear in three-dimensions. However, in label portions deviating in the circumferential direction of the cylindrical label body from the directly observed portion are curved surfaces from the observer's viewpoint, and the three-dimensional designs printed in these portions give less three-dimensional impressions as the design deviates from the directly observed portion. Thus, it is likely that the observer will recognize the three-dimensional images to be images printed on a flat surface.

According to the heat-shrinkable cylindrical label 1 of this embodiment that takes into account such characteristics of the cylindrical label, since the three-dimensional presentation of the three-dimensional design images 3 existing in the side regions is emphasized compared to the three-dimensional design images 3 in the target region, the three-dimensional design images 3 in the side regions, i.e., on the curved surfaces, can give three-dimensional impressions on an observer looking the label from the front of the target region.

Examples of the means for emphasizing the three-dimensional presentation of the three-dimensional design images 3 in the side regions include increasing the difference in brightness (increasing the contrast), changing the shapes or the like of the shade images 4, making the borders shaper, and changing the color gradation, as in the examples of the procedures of three-dimensional correction described above.

They are described in detail below.

<Increasing the Difference in Brightness>

Figure 8A:
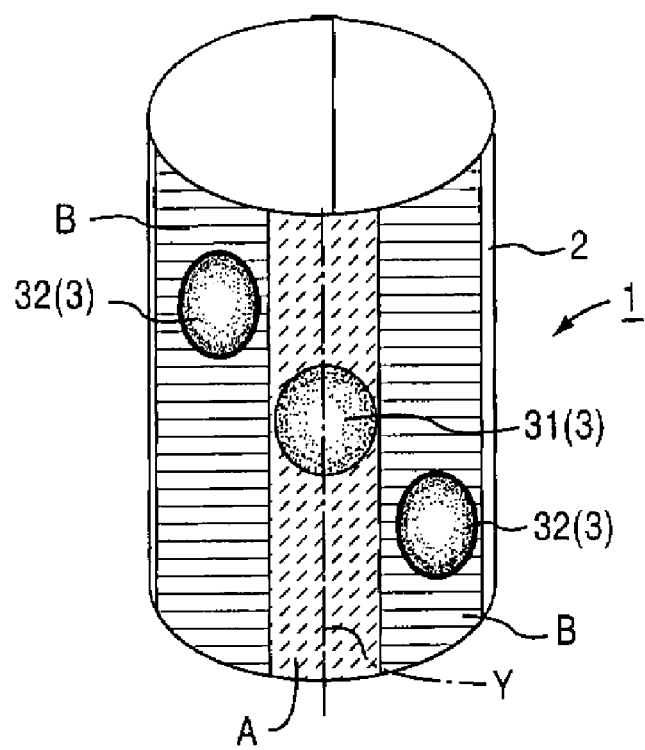
FIG. 8(a) is an oblique view showing a heat-shrinkable cylindrical label of a third embodiment and (b) is a front view of a label base material therefor.
Figure 8B:
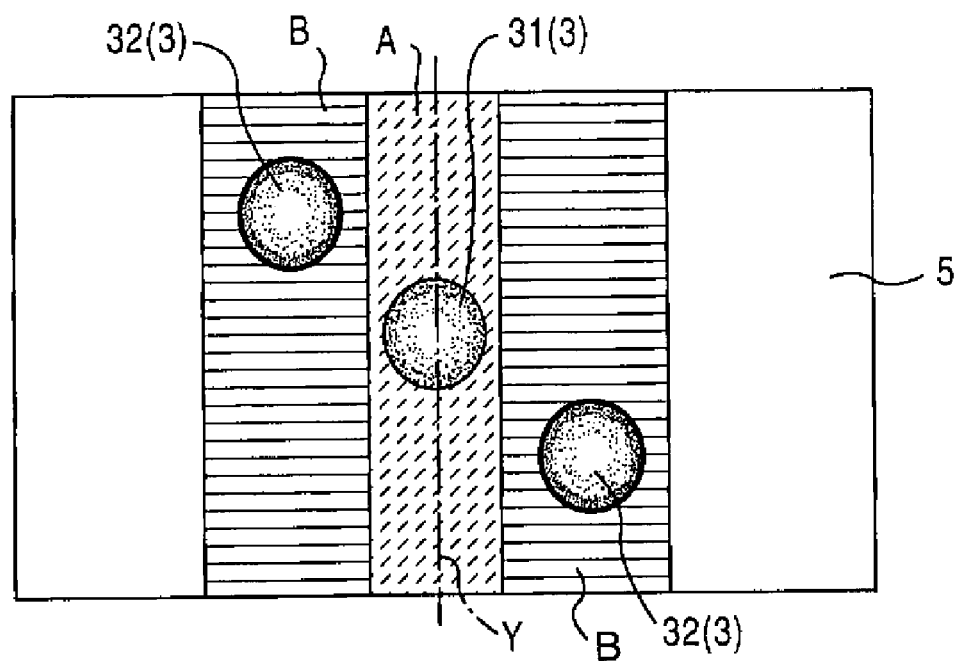

In FIG. 8, suppose that an imaginary vertical line (imaginary vertical line Y) extending in an arbitrarily determined longitudinal direction is drawn. Three-dimensional design images 32 printed in side regions B (indicated by thin horizontal lines for the sake of convenience) deviating from the imaginary vertical line Y in the circumferential direction are expressed such that the portion corresponding the projecting part of the three-dimensional model is brighter and the portion corresponding the recessed part is darker when compared with the corresponding parts of a three-dimensional design image 31 printed in a target region A (indicated by dotted oblique lines for the sake of convenience) including the imaginary vertical line Y.

For example, the three-dimensional design images 32 in the side regions B are printed such that the difference in brightness is a particular percent (e.g., 20%) higher than that of the three-dimensional design image 31 in the target region A.

Note that the side regions B are arbitrary defined regions deviating from the imaginary vertical line Y in the circumferential direction within the range perceivable by an observer who sees the cylindrical label 1 from the directly front of the imaginary vertical line Y.

In the heat-shrinkable cylindrical label 1, the three-dimensional design images 3 in the side regions B are expressed to have a larger brightness difference than the three-dimensional design image 3 in the target region A. Thus, when the label 1 is observed from the front of the target region A, satisfactory three-dimensional impressions can be given to the observer throughout the target region A and the side regions B.

Figure 9A:
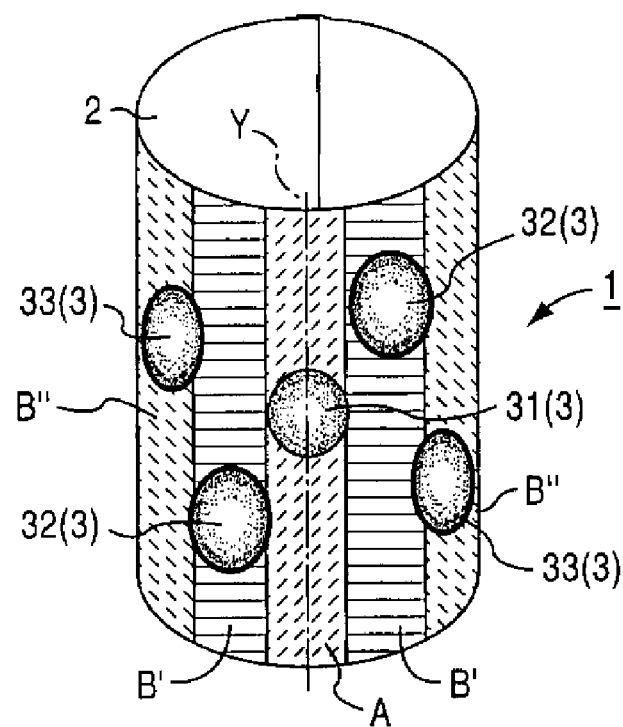
FIG. 9(a) is an oblique view showing a modification of the heat-shrinkable cylindrical label according to the third embodiment and (b) is a front view of a label base material therefor.
Figure 9B:
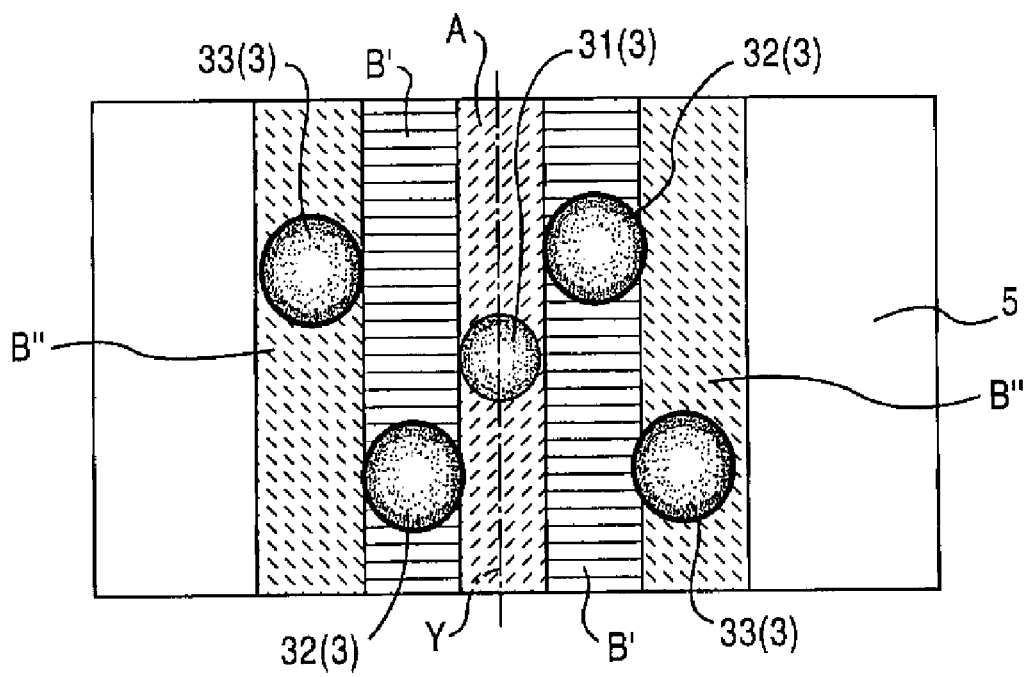

According to a modification shown in FIG. 9, the three-dimensional design images 32 printed in first side regions B' (indicated by thin horizontal lines for the sake of convenience) deviating from the target region A in the circumferential direction are expressed to have a larger brightness difference than that of the three-dimensional design image 31 in the target region A, as in the description above. Three-dimensional design images 33 printed in second side regions B" (indicated by hatching by wavy lines) further deviating from the target region A than the first side regions B' in the circumferential direction are expressed to have a larger brightness difference than that of the three-dimensional design images 32 in the first side regions B'.

For example, the three-dimensional design images 32 in the first side region B' are printed to have a brightness difference a particular percent higher than that in the target region A, and the three-dimensional design images 33 in the second side region B" are printed to have a brightness difference a particular percent higher than that in the first side region B'.

By further dividing the side regions to a plurality of segments and increasing the brightness difference as the region deviates further from the target region A in the circumferential direction, the three-dimensional design images 3 in the side regions can give stronger three-dimensional impression.

By further division, i.e., by further dividing the side region into plurality of segments, the brightness difference can be gradually increased as the region deviates from the target region A in the circumferential direction.

Note that in examples shown in FIGS. 8 and 9, the brightness differences of the three-dimensional design images 32 in both side regions B (regions B at the left-hand side and the right-hand side) at the two sides of the target region A is increased; alternatively, only one of the region may be rendered an increased brightness difference.

The heat-shrinkable cylindrical label 1 of this embodiment can be manufactured according to the following procedure, for example.

Figure 10A:
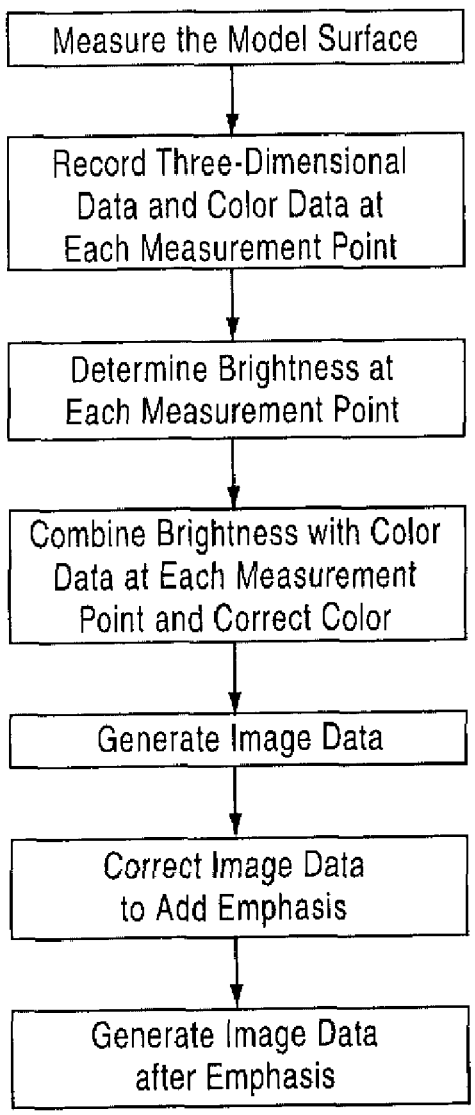
FIGS. 10(a) and (b) are each a flowchart showing the steps of generating two-dimensional image data by emphasis correction.
Figure 10B:
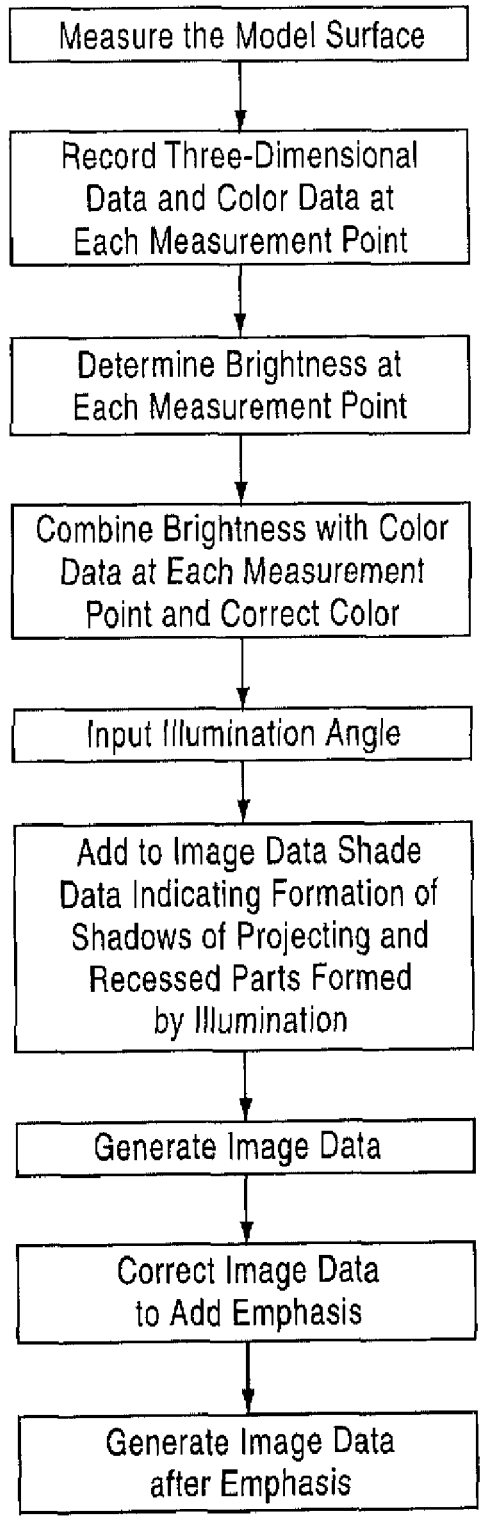

First, as shown in FIG. 10, two-dimensional image data is prepared by the method described in the first embodiment. Note that the two-dimensional image data may contain shading data representing the shade images 4.

Next, a desired imaginary vertical line is determined among the two-dimensional image data, and the three-dimensional design images 3 indicated in the original image data are divided into those in right-hand and left-hand side regions with respect to the vertical line. During this process, the side region may be further divided into a plurality of segments. Among the two-dimensional image data, correction for adding emphasis by increasing the brightness differences of the three-dimensional design images 3 in the side regions by a predetermined percentage is conducted. On the basis of the corrected and emphasized two-dimensional image data, a printing plate is prepared as in the first embodiment, and the three-dimensional design images 3 are printed on the label base material 5 using the printing plate. Subsequently, the label base material 5 is formed into a cylinder to obtain a cylindrical label 1 of the second embodiment.

<Changing Shapes or the Like of Shade Images 4>

Figure 11A:
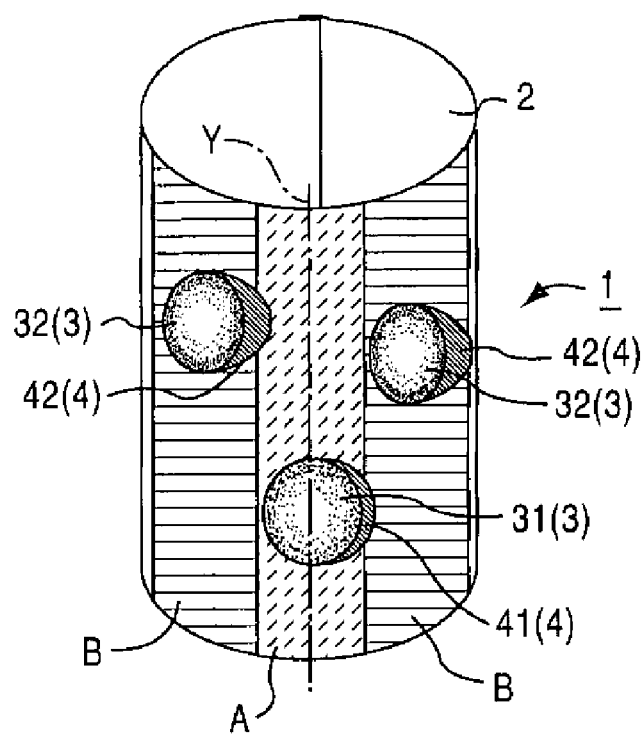
FIG. 11(a) is an oblique view showing another modification of the heat-shrinkable cylindrical label of the third embodiment and (b) is a front view of a label base material therefor.
Figure 11B:
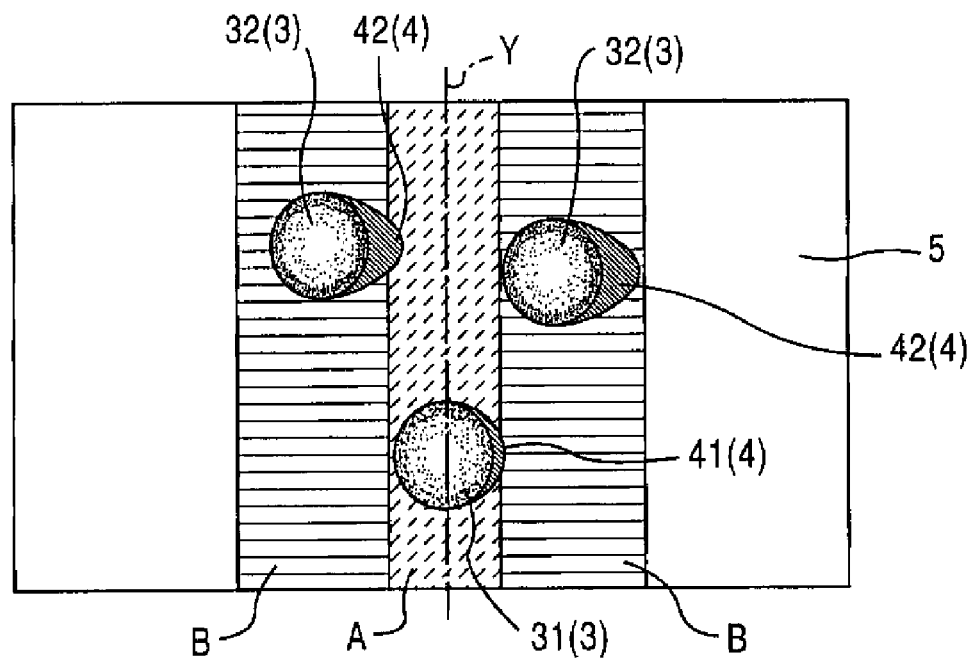

As shown in FIG. 11, shade images 42 added to the three-dimensional design images 32 in the side regions B are enlarged compared to shade images 41 added to three-dimensional design images 31 in the target region A so that the shade images 42 are enlarged in the circumferential direction of the three-dimensional model. Note that FIG. 11 represents a state in which the model is irradiated from the left-hand side.

In the heat-shrinkable cylindrical label 1, the shade images 42 added to the three-dimensional design images 3 in the side regions B are expressed to be larger than those in the target region A; thus, when the label 1 is viewed from the front of the target region A, the shade images 42 in the side regions B appear to have the same size or larger than the shade images 41 of the cylindrical label 1 even though the shade images 42 lie on the curved surface (in the direction away from the observer).

The shade images 42 in the side regions B may be enlarged into adequate shapes. For example, as with the method of changing the brightness difference described above, each side region B may be divided into a plurality of segments and the ratio of enlargement may be increased as the segment becomes farther in the circumferential direction.

In such a heat-shrinkable cylindrical label 1, due to the emphasized shade images 42 added to the three-dimensional design images 3 in the side regions B, satisfactory three-dimensional impressions can be given to the observer looking the label 1 from the front of the target region A throughout the target region A and the side regions B.

Note that in the example shown in FIG. 11, the shade images 42 are enlarged in both of the side regions B (left-hand-side and right-hand-side regions B) of the target region A; alternatively, the shade images 42 may be enlarged in only one of the side regions B.

Figure 12A:
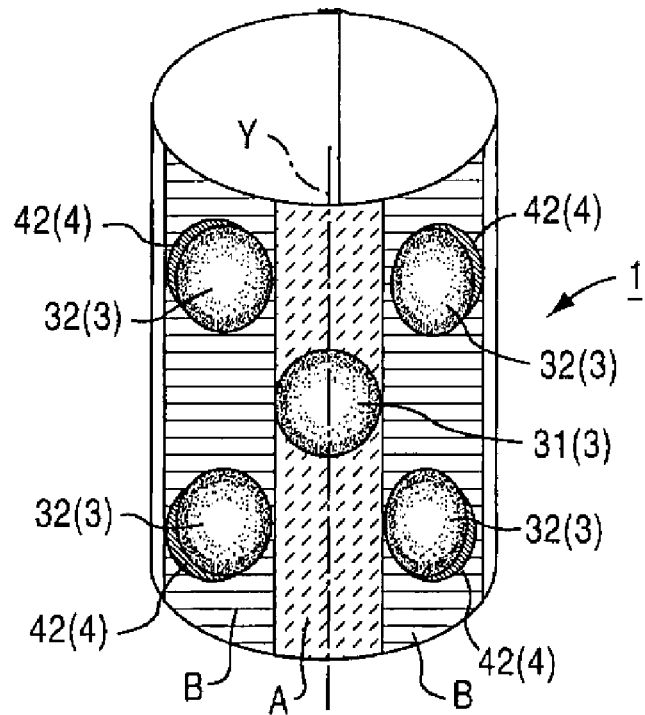
FIG. 12(a) is an oblique view showing another modification of the heat-shrinkable cylindrical label according to the third embodiment and (b) is a front view of a label base material therefor.
Figure 12B:
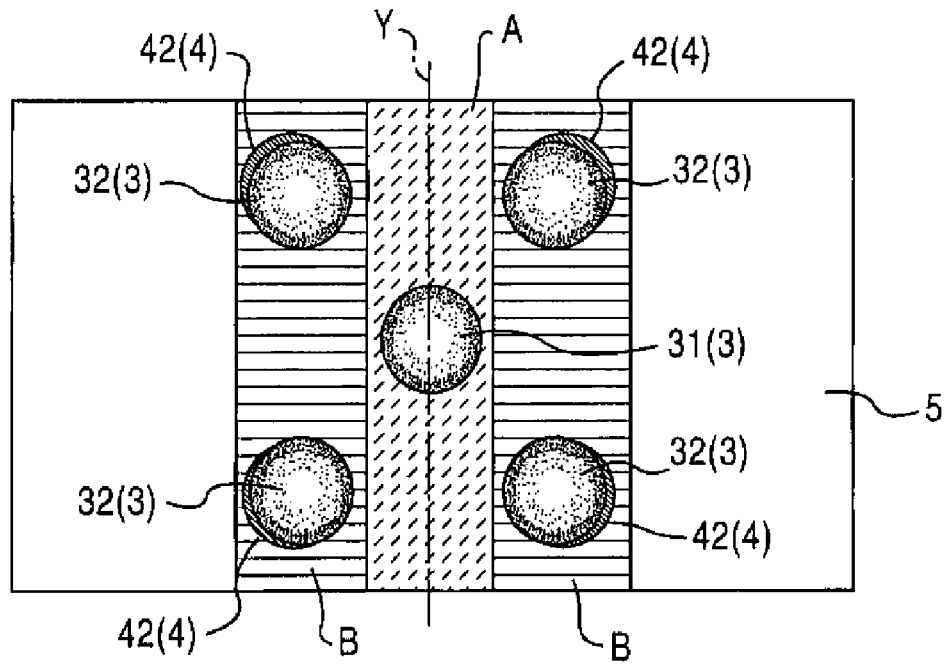

In a modification shown in FIG. 12, no shade is added to the three-dimensional design image 31 in the target region A, and shade images 42 added to the three-dimensional design images 3 in the side regions B at the left-hand-side and the right-hand-side are symmetrically expressed.

When such a heat-shrinkable cylindrical label 1 is viewed from the front of the target region A, the images appear as if vertical light is incident on the target region A and shadows caused by such light are formed next to the three-dimensional design images 32 in the side regions B on the curved surfaces.

Note that, as is described above, the shade images 42 of this modification are preferably enlarged as the shades deviate in the circumferential direction.

In this heat-shrinkable cylindrical label 1, for example, as shown in FIG. 5(*b*), in adding the shade data to the two-dimensional image data, a desired imaginary vertical line is determined, the three-dimensional design images 3 represented in the two-dimensional image data are divided into side regions on the left-hand-side and the left-hand-side (each side region may be further divided into a plurality of segments) with respect to the vertical line, and emphasis correction for deforming the shade images 4 added to the three-dimensional design images 3 in the side regions is conducted. By conducting printing on the basis of the emphasized two-dimensional image data, the heat-shrinkable cylindrical label 1 can be obtained.

<Rendering Borders Sharp and Changing Color Gradation>

The line indicating the border (shape) of each three-dimensional design image 32 in the side region B is printed to appear sharper than the line indicating the border (shape) of the three-dimensional design image 31 in the target region A. In such a heat-shrinkable cylindrical label 1, since the borders of the three-dimensional design images 32 in the side regions B are sharper than those in the target region A, the three-dimensional design images 32 in the side regions B existing on the curved surfaces are emphasized. Thus, such a heat-shrinkable cylindrical label 1 can give satisfactory three-dimensional impressions on the observer looking the label 1 from the front of the target region A throughout the cylindrical label 1 and the side regions B.

Various other techniques can be employed as the means for emphasizing the three-dimensional presentation of the three-dimensional design images 3 existing in the side regions B, including rendering the gradation of the three-dimensional design 32 in the side region B to be different from that of the three-dimensional design 31 in the target region A; and blurring the three-dimensional design image 31 in the target region A overall when compared to the three-dimensional design images 32 in the side regions B.

Note that although various means for emphasizing the three-dimensional presentation of the three-dimensional design images 3 in the side regions B are given as examples in the third embodiment, it is possible to adequately combine these techniques.

For example, the brightness difference in the three-dimensional design image 3 in the side region B may be increased while enlarging the shade images 4 added to the three-dimensional design images 3 in the circumferential direction; or the brightness difference in the three-dimensional design image 3 in the side region B may be increased while rendering the borders of the three-dimensional design images 3 to be sharper.

It is also possible to combine various processes described in this embodiment with the first embodiment and/or the second embodiment. For example, the process of printing the three-dimensional design images 3 while enlarging in the circumferential direction according to the difference in diameter of the narrow portion of the object described as an example in the second embodiment is applicable to the cylindrical label 1 of the third embodiment.

Note that although heat-shrinkable cylindrical labels are described as examples in the first to third embodiments above, the label of the present invention is not limited to such heat-shrinkable cylindrical labels. For example, the label of the present invention may be a stretchable cylindrical label formed by processing a self-stretching film (stretch film) into a cylinder, a wrap-around label to be attached around the object, such one to be attached to the middle part of the container, when use, or a cylindrical label other than these.

Furthermore, the label of the present invention may be a non-cylindrical label, e.g., an adhesive label to be bonded to an object with an adhesive or the like or a point-of-purchasing (POP) label that projects from part of the object mainly for advertising purposes.

Fourth Embodiment

A fourth embodiment relates to a measurement method for actually measuring the surface profile of the three-dimensional model and acquiring the profile height data in the circumferential direction of the three-dimensional model. In the description below, features different from the examples described in the preceding embodiments are mainly described, and the explanation of the like features is omitted by citing the terms and reference numerals.

Figure 13A:
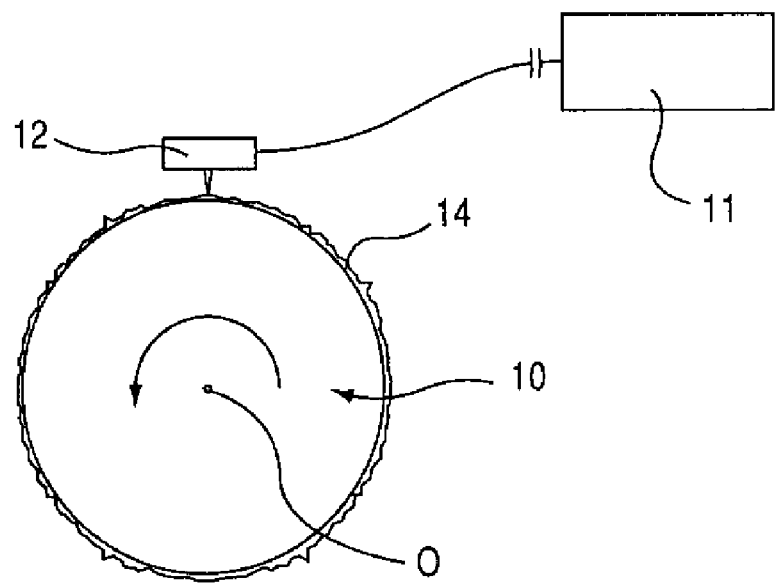
FIG. 13 shows the overall configuration of a three-dimensional model and instruments used in a measurement method of a fourth embodiment and includes part (a) which is a plan view viewed from the upper-surface-side and part (b) which is a front view with a partial cross section viewed from the side-surface-side (the projecting and recessed parts formed on the reference curved surface are indicated in vertical cross-section).
Figure 13B:
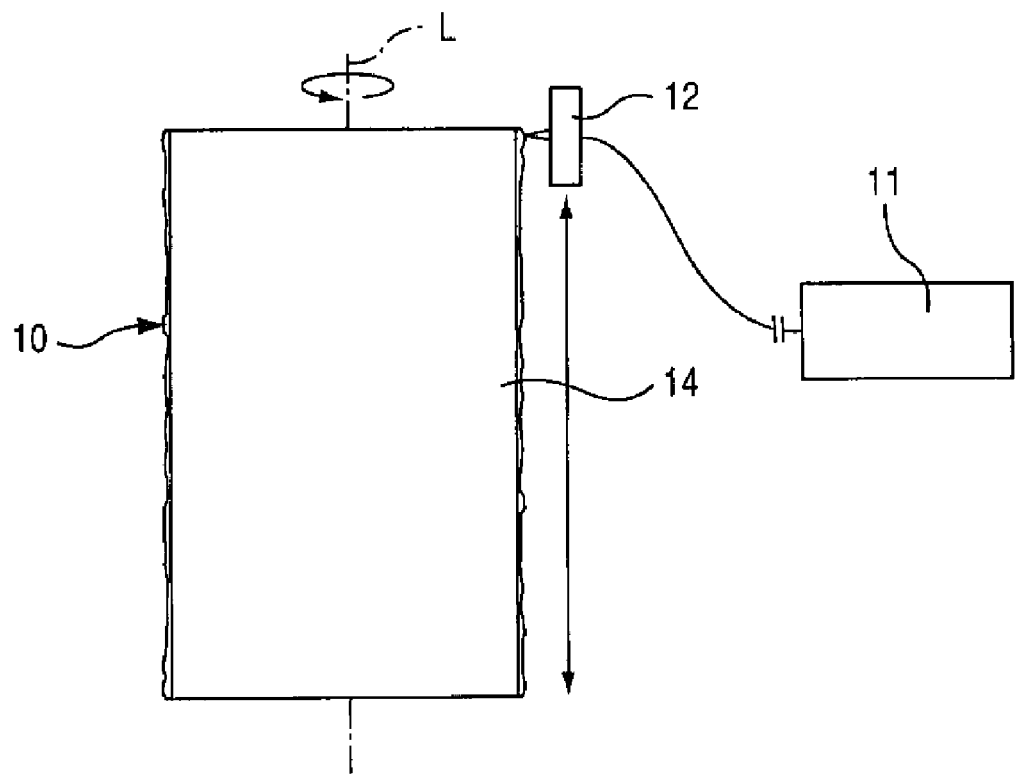

As shown in FIG. 13, a three-dimensional model 10 having a cylindrical shape is prepared. Three-dimensional designs including projecting and recessed parts and colors desired to be reproduced in the cylindrical label 1 are formed on the surface of the three-dimensional model 10. The shape of the three-dimensional model 10 is not particularly limited. Preferably, the curved surface (reference curved surface 14) on which the projecting and recessed parts (three dimensional designs) are formed into a cylindrical shape (column with a circular cross-section) or an elliptic cylindrical shape (column with an elliptic cross-section). Among these, it is preferable to use the model having a reference curved surface 14 formed into a cylinder. The size of the three-dimensional model 10 is also not particularly limited. From the standpoint of good design reproducibility, a model having substantially the same circumference as that of the cylindrical label 1 to be produced is preferable. Examples of such a three-dimensional model include a cylindrical model having projecting and recessed parts on the surface, such as a vase or jug.

Here "reference curved surface 14" of the three-dimensional model 10 means a flat, smooth curved surface of the main body on which the projecting and recessed parts (three-dimensional designs) of the three-dimensional model 10 are formed. If the three-dimensional model has projecting and recessed parts that cannot be clearly distinguished from the flat, smooth curved surface, as in the case of a vase with projecting and recessed parts, then computer simulation is conducted.

An analyzer 11 that measures the surface of the three-dimensional model 10 is not particularly limited if the analyzer can measure the height of the projecting and recessed parts of the three-dimensional model 10 by scanning. Preferably, an analyzer that can simultaneously capture the colors on the surface of the three-dimensional model 10 is used. An example of such an analyzer 11 is one described in Japanese Unexamined Patent Application Publication No. 10-27242 described in the first embodiment.

A detector 12 of the analyzer 11 is not particularly limited. As described in Japanese Unexamined Patent Application Publication No. 10-27242, an analyzer that measures the distance by allowing a stylus to come into contact with the surface of the three-dimensional model, a non-contact-type analyzer that can measure the height of the projecting or recessed parts on the basis of reflection of light, and the like may be used.

Next, the process of measuring the height of the surface of the cylindrical three-dimensional model 10 is described in detail.

Note that in the measurement process described below, the detector 12 of the analyzer 11 can measure the distance from the detector 12 to the surface of the three-dimensional model 10 at each measurement point by allowing the tip of the detector 12 to contact with the surface of the three-dimensional model 10 and to move along the projecting and recessed parts thereon.

Furthermore, the detector 12 can also move in the longitudinal direction (the direction indicated by the arrow, i.e., the direction orthogonal to the circumferential direction) of the three-dimensional model 10. The three-dimensional model 10 is rotatable about the axis of rotation L, which is the axial core extending in the longitudinal direction through the center point O.

Figure 14A:
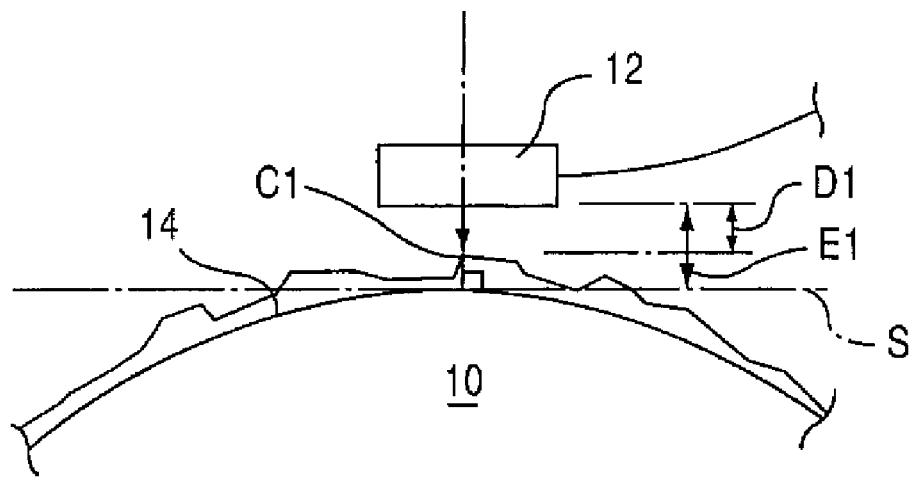
FIGS. 14(a) and (b) are each a partially omitted plan view showing a step of acquiring height data according to the measurement method of the fourth embodiment.

As show in FIG. 14(a), the detector 12 of the analyzer 11 is operated to be substantially orthogonal to a tangent S of the reference curved surface 14 at a particular point on the three-dimensional model 10 (e.g., a point at the upper end), which is a measurement point (X, Y) C1. A distance D1 between the detector 12 and the surface of the three-dimensional model 10 with projecting and recessed parts is then measured at the measurement point C1.

On the other hand, a distance E1 between the detector 12 and the reference curved surface 14 of the three-dimensional model 10 is previously measured at the measurement point C1 (alternatively, the distance E1 to the reference curved surface 14 calculated by computer simulation may be used), and the distance D1 is subtracted from the distance E1 to the reference curved surface 14 to obtain height data (height value) of the projecting or recessed part at the measurement point C1.

The height of the projecting or recessed part at the measurement point is equal to [distance between the reference curved surface of the three-dimensional model and the detector substantially orthogonal to the tangent]−[distance between the surface of the three-dimensional model and the detector substantially orthogonal to the tangent].

Note that when the reference curved surface 14 of the three-dimensional model 10 is substantially cylindrical, the distance between the detector 12 and the reference curved surface 14 is the same at every measurement point.

During the measurement of height, it is preferable to simultaneously capture the colors (color value) on the surface of the three-dimensional model 10 at the measurement point C1 with a camera.

Figure 14B:
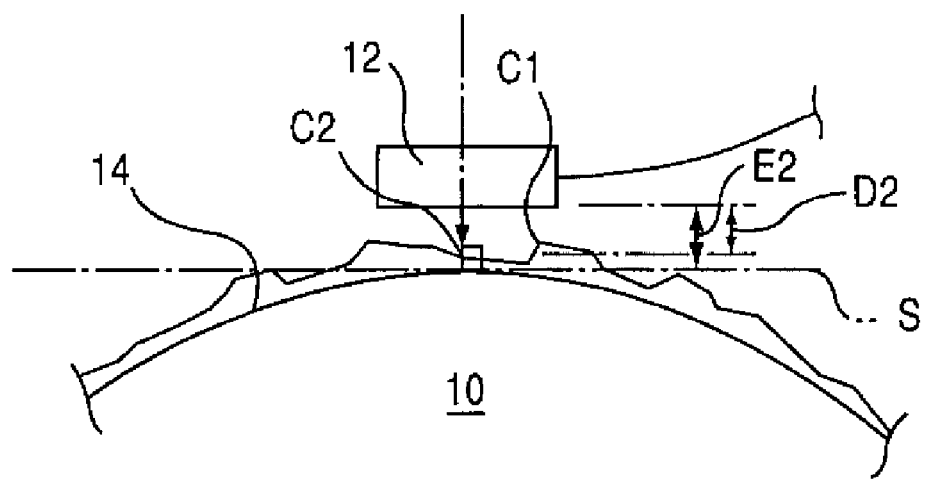

Next, as shown in FIG. 14(*b*), the three-dimensional model 10 is rotated by one frame in a particular direction (e.g., counterclockwise).

After the three-dimensional model 10 is rotated, the detector 12 of the analyzer 11 is allowed to come into contact with the model such that the detector 12 is substantially orthogonal to the tangent S of the reference curved surface 14 at the measurement point C2 in the second row. The distance D2 between the detector 12 and the surface of the three-dimensional model 10 with projecting and recessed parts is measured at the measurement point C2.

The height data (height value) of the projecting or recessed part at the measurement point C2 can be obtained by subtracting the distance D2 from the distance E2 between the detector 12 and the reference curved surface 14 of the three-dimensional model 10 at the measurement point C2. Subsequently, the same operation is conducted by rotating the three-dimensional model 10 frame by frame in a predetermined direction (e.g., counterclockwise) so as to obtain the height data of the projecting and recessed parts and the color data at individual measurement points in the circumferential direction. Note that the measurement point (X, Y) corresponds to one pixel. When the number of measurement points for the detector 12 is large (in other words, when the moving distance of the detector 12 per frame is small), an image having a high resolution in the circumferential direction can be obtained.

After the three-dimensional model 10 is rotated once and the measurement of the first column by the detector 12 is completed, the detector 12 is moved downward (in the longitudinal direction) by one frame, and the height data of the projecting and recessed parts and color data at individual measurement points in the second column are measured while rotating the three-dimensional model 10 frame by frame as described above. When the moving distance of the detector 12 in the longitudinal direction for one frame is small, an image with a high resolution in the longitudinal direction can be obtained.

Subsequently, a cycle of moving the detector downward by one frame, rotating the three-dimensional model 10, and measuring at each point is repeated in the same manner. As a result, a set of three-dimensional data (including height data) and the color data at all measurement points on the surface of the three-dimensional model 10 can be obtained.

The obtained data is captured in the image-processing apparatus described in the first embodiment and subjected to a predetermined three-dimensional correction to be converted to two-dimensional image data.

A printing plate is then formed on the basis of the two-dimensional image data, and a cylindrical label 1 or the like is produced therewith.

According to the measurement method of this embodiment, since the detector 12 is operated to be substantially orthogonal to the tangent S of the reference curved surface 14 of the three-dimensional model 10 at each measurement point so as to obtain the height data of the projecting or recessed part, the cylindrical label 1 on which the three-dimensional design images 3 are printed on the basis of such data can give realistic three-dimensional impressions close to the three-dimensional model 10 even when the label is viewed in any direction around the circumference.

Use of the two-dimensional image data obtained by the measurement method of this embodiment is not limited to production of the cylindrical label 1. The data can be used for printing plates for producing a flat adhesive label to be attached to a columnar (such as cylindrical) container (object) or a wrap-around label to be attached around the object. Such an adhesive label also becomes curved as it is attached to the middle part of a cylinder; however, since original images obtained according to the measurement method of the present embodiment are printed, realistic three-dimensional impressions can be given to an observer even when the label is viewed in any direction around the circumference.

Note that although the case of rotating the three-dimensional model 10 is given as an example in the above-described embodiment, it is possible to move the detector 12 frame-by-frame in the circumferential direction of the three-dimensional model 10 to measure the height of the projecting and recessed parts. Alternatively, it is possible to move the three-dimensional model and the detector 12 in the circumferential direction (both are relatively moved) so as to measure the height of the projecting and recessed parts. However, as described above, the method of rotating the three-dimensional model 10 is preferable since the mechanism of the analyzer can be simplified.

Although the height of the projecting and recessed parts is measured throughout the entire circumference of the surface of the three-dimensional model 10 in this embodiment, only part of the three-dimensional model 10 in the circumferential direction may be measured, such as ½ or ⅔ around the three-dimensional model 10. Similarly, the measurement in the longitudinal direction is not limited to measurement from the upper edge through the lower edge.

In this embodiment, the height data for the projecting and recessed parts is determined by subtracting the distance between the detector 12 and the reference curved surface 14 of the three-dimensional model 10 every time the distance between the detector 12 and the surface of the three-dimensional model 10 with projecting and recessed parts is measured at each measurement point; however, the measurement method is not limited to this. For example, the subtraction may be carried out after the distance between the detector 12 and the surface of the three-dimensional model 10 with the projecting and recessed parts is measured at all measurement points.

The order of measurement is not limited to the order in which measurement at measurement points is conducted first in the circumferential direction, the detector 12 is then moved downward by one frame, and measurement at measurement points is conducted again in the circumferential direction. For example, data at each measurement point in the first row may be acquired by moving the detector 12 downward frame-by-frame, the three-dimensional model may then be rotated by one frame in the circumferential direction, and the data at each measurement point in the second row may be acquired while moving the detector 12 downward frame-by-frame.

Fifth Embodiment

A fifth embodiment relates to a measurement method in which height data of the surface of a cylindrical three-dimensional model is acquired by a technique different from that of the fourth embodiment. In the description below, features different from the examples described in the preceding embodiments are mainly described, and the explanation of the like features is omitted by citing the terms and reference numerals.

As shown in FIG. 15, a cylindrical three-dimensional model 10 is prepared. A portion of the three-dimensional model 10 is provided with a three-dimensional design including projecting and recessed parts and colors desired to be reproduced on the cylindrical label 1. Examples of the design of the three-dimensional model 10 include coins and three-dimensional marks (three-dimensional trademarks).

An analyzer 11 that measures the surface of the three-dimensional model 10 may be the same type as that in the fourth embodiment except for the moving direction of the detector 12 as described below.

A procedure of measuring the surface height of the cylindrical three-dimensional model 10 will now be described in detail.

Figure 15A:
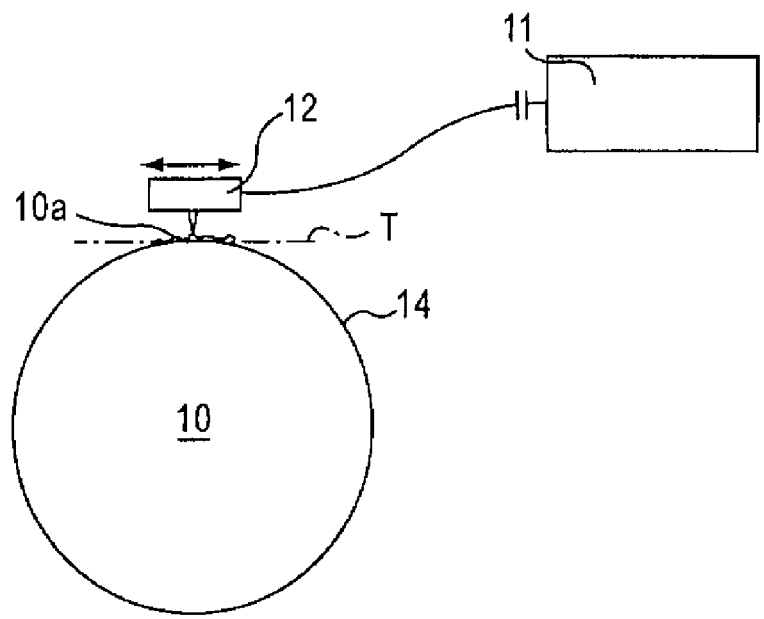
FIG. 15 shows the overall configuration of a three-dimensional model and instruments used in a measurement method of a fifth embodiment and includes part (a) which is a plan view viewed from the upper-surface-side and part (b) which is a front view viewed from the side-surface-side.
Figure 15B:
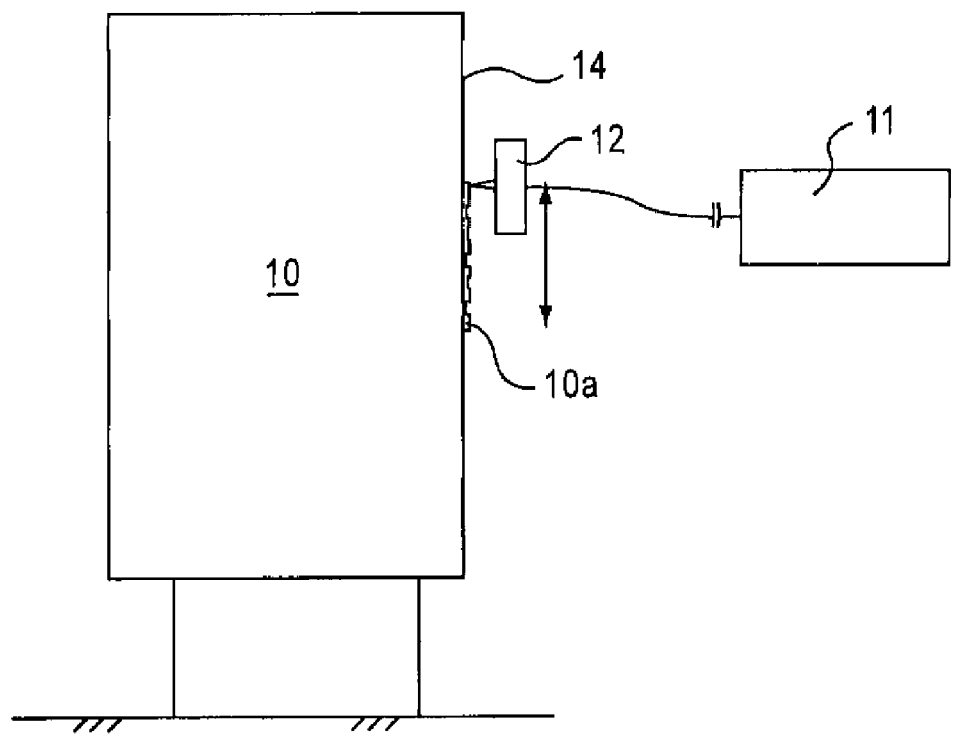

Note that in the measurement method described below, the detector 12 of the analyzer 11 can move on a plane parallel to the plane including the tangent S of the reference curved surface 14 of the three-dimensional model 10 at a particular measurement point and can move in the crosswise direction. In other words, as shown by the arrow in FIG. 15(b), the detector 12 can move in the longitudinal direction of the cylindrical three-dimensional model 10 and, as shown in FIG. 15(a), can move crosswise in parallel to the tangent T in contact with the reference curved surface 14 at a particular measurement point within a range 10a, which is part of the surface of the three-dimensional model 10 to be measured.

The three-dimensional model 10 does not rotate and is fixed.

Figure 16A:
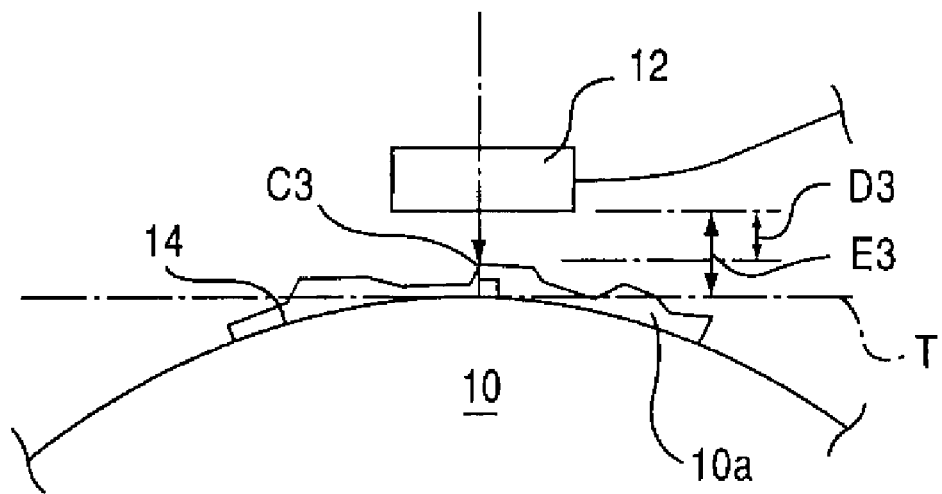
FIGS. 16(*a*) and (*b*) are each a partially omitted plan view showing a step of acquiring height data according to the measurement method of the fifth embodiment.

First, as shown in FIG. 16(a), the target range 10a to be captured as a design is selected from the surface of the three-dimensional model 10, and the detector 12 of the analyzer 11 is operated to be substantially orthogonal to the tangent T of the reference curved surface 14 at one point in the range 10a (e.g., a point at the center), i.e., a measurement point (X, Y) C3, and a distance D3 between the detector 12 and the surface of the three-dimensional model 10 with projecting and recessed parts is measured at the measurement point C3.

A distance E3 between the detector 12 and the reference curved surface 14 of the three-dimensional model 10 is previously measured at the measurement point C3 (alternatively, a distance E3 to the reference curved surface 14 determined by computer simulation may be used), and, as in the fourth embodiment above, the distance D3 is subtracted from the distance E3 to the reference curved surface 14 to thereby determine the height data (height value) of the projecting or recessed part at the measurement point C3.

In measuring the height, it is preferable to simultaneously capture the colors (color values) on the surface of the three-dimensional model 10 at the measurement point C3 with a camera.

Next, the detector 12 is moved downward (in the longitudinal direction) by one frame, and the profile height data and color data are measured at the next measurement point in the same manner as at the measurement point C3. Subsequently, the profile height data and the color data at each measurement point in the longitudinal direction are obtained in the same manner by moving the detector 12 downward frame-by-frame.

Figure 16B:
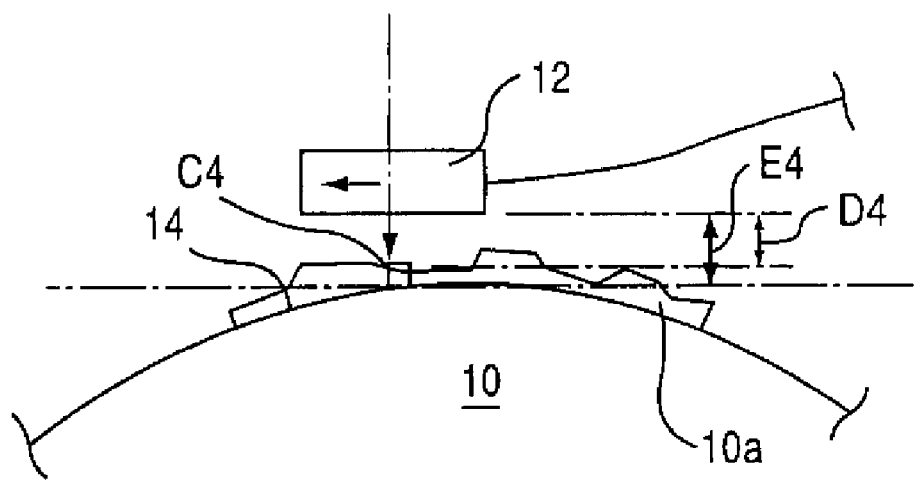

After measurement for one row is completed by moving the detector 12 to the lowermost edge, the detector 12 is moved upward to return to the upper edge of the target range 10a, and as shown in FIG. 16(b), the detector 12 is moved in parallel to the tangent T by one frame.

After the three-dimensional model 10 is moved crosswise in parallel to the tangent T, the distance between the detector 12 and the surface of the three-dimensional model 10 with projecting and recessed parts is measured at a measurement point C4 in the second row.

Profile height data (height value) at the measurement point C4 can be obtained by subtracting the distance D4 from the distance E4 between the detector 12 and the reference curved surface 14 of the three-dimensional model 10 at the measurement point C4.

Subsequently, the detector 12 is moved in the longitudinal direction, the profile height data and color data are acquired at each measurement point in the second row, and the detector 12 is moved in parallel to the tangent T by one frame in the same fashion. Then the measurement for the third row and onward is repeated. In this manner, the profile height data and the color data of about a half of the target range 10a of the three-dimensional model 10 (e.g., the left half from the measurement starting point C3) can be obtained.

A set of three-dimensional data including the profile height data of the target range 10a of the three-dimensional model 10 and the color data can be obtained by measuring the remaining half in the same manner.

The data obtained is captured in the image-processing apparatus described as an example in the first embodiment, and subjected to particular three-dimensional correction to be converted to two-dimensional image data.

A printing plate is prepared on the basis of the two-dimensional image data and a cylindrical label 1 or the like is produced using the printing plate.

According to the measurement method of this embodiment, the profile height data is obtained by actually measuring the profile height data in the circumferential direction of the three-dimensional model 10 while moving the detector 12 in substantially parallel to a tangent T and subtracting the distance between the detector 12 and the reference curved surface 14, distance which differs at each measuring point, therefrom.

When the cylindrical label 1 on which the three-dimensional design images 3 are printed on the basis of the two-dimensional image data is fastened to a columnar container (object), such as cylindrical container, the cylindrical label 1 can give realistic three-dimensional impressions on an observer directly looking the three-dimensional design images 3 while moving the container in the crosswise direction.

Note that, as in the fourth embodiment described above, the two-dimensional image data obtained by the measurement method of this embodiment can also be used in printing plates for producing adhesive labels and wrap-around labels.

Moreover, although the three-dimensional model 10 in this embodiment has designs in only part of the model, it is possible to use a three-dimensional model 10 having three-dimensional designs over the entire body.

Moreover, in this embodiment, the three-dimensional model 10 is fixed and the detector 12 is moved in substantially parallel to the tangent T. Alternatively, the three-dimensional model 10 may be moved crosswise in parallel to the detector 12.

The measurement starting point is not limited to the center of the measured range 10a. For example, measurement may be started from one side end.

The order of measurement is not limited to acquiring data at each measurement point in the first row by moving the detector 12 downward frame-by-frame, moving the detector crosswise by one frame, and then acquiring data at each measurement point in the second row by actual measurement.

For example, the data at each measurement point in the first column may be measured by moving the detector 12 crosswise frame-by-frame, and then the detector 12 may be moved downward by one frame to obtain the data at each measurement point in the second column by actual measurement.

The invention claimed is:

1. A heat-shrinkable cylindrical label that can be fastened to an object such as a container by heat-shrinking, comprising:
   two-dimensional images expressing three-dimensional design images that are printed on a cylindrical label body, in which printing is conducted on the basis of two-dimensional image data, which three-dimensionally expresses a three-dimensional model on a flat surface by three-dimensionally correcting data obtained by actually measuring heights of projecting and recessed parts and colors on a surface of the three-dimensional model, and in which each three-dimensional design image includes a portion which corresponds to the projecting part of the three-dimensional model and which is expressed as bright and a portion which corresponds to the recessed part of the three-dimensional model and which is expressed as dark; and
   further comprising an imaginary vertical reference line in the cylindrical label body,
   wherein the three-dimensional design image existing in a side region deviating from the imaginary vertical reference line in a circumferential direction of the cylindrical label body has an emphasized three-dimensional presentation compared to the three-dimensional design image existing in a target region including the imaginary vertical reference line.

2. The heat-shrinkable cylindrical label according to claim 1, wherein a difference in brightness between the portion corresponding to the projecting part and the portion corresponding to the recessed part is greater in the three-dimensional design image existing in the side region than in the three-dimensional design image existing in the target region.

3. The label according to claim 1, wherein shade images are added to the three-dimensional design images in the side region, and
   the shade images in the side region are enlarged in the circumferential direction of the cylindrical label body.

4. The label according to claim 3, wherein shade images are added to the three-dimensional design images in the target region, and
   the shade images in the side region are enlarged compared to the shade images in the target region so that the shade images in the side region are enlarged in the circumferential direction of the cylindrical label body.

5. The label according to claim 3, wherein the shade images in the side region at the left-hand-side from the target region and the shade images in the side region at the right-hand-side from the target region are symmetrically expressed.

6. The label according to claim 3, wherein the shade images are generated by irradiating the three-dimensional model with light in a desired direction to actually form shadows of the projecting portions,
   actually measuring the heights of the projecting and recessed parts, and the colors on the surface of the three-dimensional model in such a state, and
   three-dimensionally correcting the colors that actually darkened due to the shadows as a color data (R, G, B).

7. The label according to claim 3, wherein the shade images are generated by designating a desired illumination angle to the two-dimensional image data,
   computing a shade data that expresses shadows, which are expected to form according to the actually measured height data of the surface of the three-dimensional model and the designated illumination angle, by using a dark color, and
   adding the shade data to the two-dimensional image data.

8. The label according to claim 1, wherein a line indicating a border of the three-dimensional design image in the side region is printed to appear sharper than a line indicating a border of the three-dimensional design image in the target region.

9. The label according to claim 1, wherein a gradation of the three-dimensional design image in the side region renders to be different from a gradation of the three-dimensional design image in the target region.

10. A heat-shrinkable cylindrical label comprising:
    a two-dimensional image expressing a three-dimensional design image, wherein the two-dimensional image is printed on the heat-shrinkable cylindrical label, and
    when an imaginary vertical line is assumed to exist in front of the cylindrical label, the two-dimensional image existing in the side region that deviates from the imaginary vertical line in the circumferential direction of the cylindrical label body has more emphasized three-dimensional presentation than the two-dimensional image in the target region containing the imaginary vertical line.

11. The heat-shrinkable cylindrical label according to claim 10, wherein the two-dimensional image in the side region and the two-dimensional image in the target region include a portion which is expressed as bright and corresponds to a projecting part and a portion which is expressed as dark and corresponds to a recessed part, and
    a difference in brightness between the portion corresponding to the projecting part and the portion corresponding to the recessed part of the two-dimensional image in the side region is greater than a difference in brightness between the portion corresponding to the projecting part and the portion corresponding to the recessed part of the two-dimensional image in the target region.

12. The heat-shrinkable cylindrical label according to claim 10, wherein shade image is added to the two-dimensional image in the side region and the two-dimensional image in the target region, and
    the shade image added to the two-dimensional image in the side region is expressed to be enlarged in the circumferential direction of the cylindrical label body than the shade image added to the two-dimensional image in the target region.

13. The heat-shrinkable cylindrical label according to claim 10, wherein the side regions are provided at the left-hand-side and the right-hand-side of the target region,
    the shade images are added to only the two-dimensional images in the side regions, and
    the shade Images added to the left-hand-side and the right-hand-side of the two-dimensional images in the side regions are symmetrically expressed.

14. The heat-shrinkable cylindrical label according to claim 10, wherein the line indicating the border of the two-dimensional image in the side region is printed to appear sharper than the line indicating the border of the two-dimensional image in the target region.

15. The heat-shrinkable cylindrical label according to claim 10, wherein the gradation of the two-dimensional image in the side region is different from the gradation of the two dimensional image in the target region.

* * * * *